United States Patent
Ciabarra, Jr. et al.

(10) Patent No.: US 11,698,827 B2
(45) Date of Patent: Jul. 11, 2023

(54) PROACTIVE LEARNING OF NETWORK SOFTWARE PROBLEMS

(71) Applicant: Quantum Metric, Inc., Colorado Springs, CO (US)

(72) Inventors: Mario Luciano Ciabarra, Jr., Colorado Springs, CO (US); Adam Dille, Monument, CO (US)

(73) Assignee: Quantum Metric, Inc., Colorado Springs, CO (US)

( * ) Notice: Subject to any disclaimer, the term of this patent is extended or adjusted under 35 U.S.C. 154(b) by 0 days.

(21) Appl. No.: 17/180,400

(22) Filed: Feb. 19, 2021

(65) Prior Publication Data

US 2021/0255914 A1 Aug. 19, 2021

Related U.S. Application Data

(60) Provisional application No. 62/978,769, filed on Feb. 19, 2020.

(51) Int. Cl.
*G06F 11/07* (2006.01)

(52) U.S. Cl.
CPC ........ *G06F 11/079* (2013.01); *G06F 11/0709* (2013.01); *G06F 11/0793* (2013.01)

(58) Field of Classification Search
CPC . G06F 11/0709; G06F 11/079; G06F 11/0793
See application file for complete search history.

(56) References Cited

U.S. PATENT DOCUMENTS

| | | | |
|---|---|---|---|
| 11,093,319 B2 * | 8/2021 | Krishnaswamy | ... G06F 11/0751 |
| 2006/0293921 A1 | 12/2006 | McCarthy et al. | |
| 2009/0006995 A1 | 1/2009 | Error et al. | |
| 2017/0064019 A1 * | 3/2017 | Asvaraksh | ............. H04L 67/02 |
| 2017/0171620 A1 | 6/2017 | Oren et al. | |
| 2018/0039530 A1 | 2/2018 | Ciabarra, Jr. et al. | |

(Continued)

OTHER PUBLICATIONS

International Application No. PCT/US2021/018854, "Invitation To Pay Additional Fees And, Where Applicable, Protest Fee", dated Apr. 9, 2021, 2 pages.

(Continued)

*Primary Examiner* — Joseph R Kudirka
(74) *Attorney, Agent, or Firm* — Kilpatrick Townsend & Stockton LLP

(57) ABSTRACT

The present embodiments relate to proactive learning of network software problems. In an embodiment, a method includes receiving, by a detection system, webpage data from a computer system. The computer system can receive the webpage data from a plurality of client devices. The webpage data can be associated with user identifiers identifying each client device of the plurality of client devices. The detection system can then receive assistance data from a user assistance computer. The user assistance computer can receive the assistance data from a plurality of user devices. The assistance data can be associated with user identifiers identifying each user device of the plurality of user devices. The detection system can label the webpage data based on the assistance data including matching user identifiers and then determine at least a pattern based on the labeled webpage data.

29 Claims, 9 Drawing Sheets

(56) References Cited

U.S. PATENT DOCUMENTS

2018/0329801 A1* 11/2018 McKee ............... G06F 11/3624
2019/0140977 A1    5/2019 Miller et al.

OTHER PUBLICATIONS

International Application No. PCT/US2021/018854, "International Search Report And The Written Opinion", dated Jul. 21, 2021, 12 pages.
Williams et al., "WS://IM: A Software Framework for Multimodal Web Interaction Management", Virginia Polytechnic Institute and State University, Available Online At: https://vtechworks.lib.vt.edu/bitstream/handle/10919/9958/thesis.pdf?sequence=1 &isAllowed=y, May 3, 2004, 67 pages.
International Application No. PCT/US2021/018854, "International Preliminary Report on Patentability", dated Sep. 1, 2022, 9 pages.

* cited by examiner

PROACTIVE LEARNING OF NETWORK SOFTWARE PROBLEMS

CROSS-REFERENCES TO RELATED APPLICATIONS

The present application claims priority from and is a non-provisional application of U.S. Provisional Application No. 62/978,769, entitled "PROACTIVE LEARNING OF NETWORK SOFTWARE PROBLEMS" filed Feb. 19, 2020, the entire contents of which are herein incorporated by reference for all purposes.

FIELD

The present disclosure relates generally to monitoring an interactive software application (e.g., a network application involving a website) and determining resolutions to errors generated therein.

BACKGROUND

Since the introduction of client-side web technologies such as JavaScript, electronic documents (e.g., a webpage) accessed on the Internet have become increasingly dynamic. Accessing a data table in a document to sort columns or filter data, changing a Document Object Model (DOM) element opacity/location/dimensions/content, and asynchronously fetching and displaying data are just some examples of how web documents have become progressively richer with dynamic content and interactions.

An application on a client may allow users to view and interact directly with an electronic document in various ways including, without limitation, clicking on interactive elements to interact with or reload a document, navigating between documents, and requesting content to be displayed in a document. An interaction with a document may result in processing delays to present the document and/or load content based on the interaction. For example, interaction with a document may result in a time-consuming request to a server for a content change. A delay in processing the request may limit a user's ability to view and/or interact with the document. In another example, an interaction with a document results in delays or an error in execution of program code configured to execute for a document.

Because electronic documents are dynamic within an application on a client, operators that provide the documents do not have a clear insight into how their audience encounters and reacts to problems in accessing electronic documents. Despite having created the content for a document, but because of the large amount of permutations of how users can interact with an individual document or groups of documents, users (e.g., providers, designers, operators, and document creators) may seek to determine the problems that users have in interacting with electronic documents. Traditionally, network-to-desktop browsers was viewed as reliable and adhering to fairly consistent and predictable performance patterns. In the new environment where users increasingly access data from any device, and over widely varying network conditions, the proposition that performance is consistent is no longer valid. Users may see only partial content before getting frustrated and leaving a page or website. They may get frustrated due to content that does not even come from the primary website, but instead is sourced from Content Distribution Networks or external advertising or social media sites. Users may get frustrated over delays in loading and/or accessing content for a document. An administrator of a website may be unable to identify a source of issues with accessing web documents.

Products can also capture user interaction events on a remote web document. Specifically with respect to capturing mouse clicks and mouse movement, systems have approached tracking of these types of events by capturing the Cartesian coordinates where a mouse moves, and the Cartesian coordinates of where a user performs mouse clicks. This has been moderately effective in the past. However, as the number of devices used to access web documents increase and the number of varying screen displays increases, web designers have transitioned to a more dynamic, or responsive, document design and operation, where the content layout changes dynamically based on the client's screen size. As such, simply capturing Cartesian coordinates is ineffective and inaccurate at helping web operators and designers analyze how users interact with their document, as the results are not clear with respect to what the user clicked or what content a mouse went over, in, or out of Documents of a website may change dynamically with regard to a DOM defining a structure of content on the website. Documents may be related to one another such that interaction with one document affects presentation of a different document. Even more difficult is determining how unrelated events affecting interaction with or operation of a website may be correlated to a single issue with operation of the website. Such events may cause frustration with use of the website, without a host system hosting the website being fully aware of the significance of such events. Detecting related events may be difficult as websites shift towards dynamic implementations.

As a result of these challenges, computer systems that host a website are challenged with ways to detect issues in operation of a website, some issues of which lead to frustration by users of the website. These issues may affect the performance of the computers that host a website. A tremendous amount of financial and computing resources are expended to detect, if at all possible, and correct these issues to limit their exposure to the user's experience of the website.

Furthermore, in some cases, a user may contact a customer service representative for assistance with a website. Such human interaction is expensive and can be time consuming for the representative and the user. Accordingly, improved techniques are desirable to facilitate users with resolving problems encountered with dynamic network documents, e.g., web pages.

SUMMARY

Embodiments of the present disclosure provide improved techniques related to a detection system monitoring interactions of client devices with a website (e.g., via a browser or a native application) and coordinating with a user assistance system (e.g., a computer of person associated with the website). As an example, the detection system can assign user session data to assistance data (e.g., information about errors) from the user assistance system to identify key features in the user session data, e.g., that establish a pattern between the session data and the assistance data; such a pattern may be used to identify and provide timely packets of data to the user assistance system.

As another example, the detection system can identify one or more key features (occurring in associated with a population of assistance requests) in webpage data associated with a current user assistance request, and provide resolution data based on the one or more key features. This can allow for efficient and real-time identification of resolution data for a current request to mitigate any errors/inefficiencies experienced by the user while interacting with a website.

As another example, the detection system can provide resolution data to a server associated with the website, where the resolution data is determined based on the extracted features with a certainty level exceeding a threshold. This can allow for efficient identification of resolution data, e.g., before user assistance request occurs.

According to some embodiments, a method can include receiving webpage data associated with user interactions of a plurality of client devices of a website executing on a server computer. The webpage data can be associated with user identifiers identifying each client device of the plurality of client devices and includes webpage temporal information. The method can also include receiving, by the detection system, assistance data from a user assistance system for a plurality of assistance requests. The user assistance system can receive the assistance data from a plurality of user devices during the plurality of assistance requests. The assistance data can be associated with user identifiers identifying each user device of the plurality of user devices and includes assistance temporal information.

The method can also include, for each assistance request of the plurality of assistance requests, assigning, by the detection system, a portion of the webpage data to the assistance request based on the assistance data and the portion of the webpage data including a matching user identifier and matching temporal information, thereby generating labeled webpage data. The method can also include analyzing the labeled webpage data to identify one or more key features of the portions of webpage data that occur in the plurality of assistance requests at a frequency above a threshold.

Other embodiments relates to a method comprising receiving, by the detection system, a user identifier from a user assistance computer in response to a user of a client device requesting assistance for a website from the user assistance computer. The method can also include determining, by the detection system, webpage data for a current session of the website stored in a database based on the user identifier.

The method can also include extracting, by the detection system, features from the webpage data. The method can also include querying, by the detection system, using the extracted features, a key feature database to identify one or more key features. The method can also include determining, by the detection system, resolution data based on the one or more key features. The method can also include providing, by the detection system, the resolution data to the user assistance computer.

Further embodiments relate to a method including a detection system receiving webpage data associated with a user interaction of a client device of a website executing on a server computer. The webpage data can include an error and webpage temporal information. The method can include extracting, by the detection system, features from the webpage data. The method can include querying, by the detection system, using the extracted features, a key feature database to identify one or more key features that occur in association with a population of assistance requests at a frequency above a threshold. In this manner, the detection system can label the webpage data based on the assistance data including matching user identifiers and then determine at least a pattern based on the labeled webpage data.

The method can include determining, by the detection system, resolution data based on the one or more key features. The resolution data can comprise at least one action and a certainty level. The method can include determining, by the detection system, whether or not the certainty level exceeds a predetermined threshold. The method can include, if the certainty level exceeds the predetermined threshold, providing, by the detection system, the resolution data to the server computer.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

Further details regarding embodiments of the disclosure can be found in the Detailed Description and the Figures.

TERMS

Figure 1:
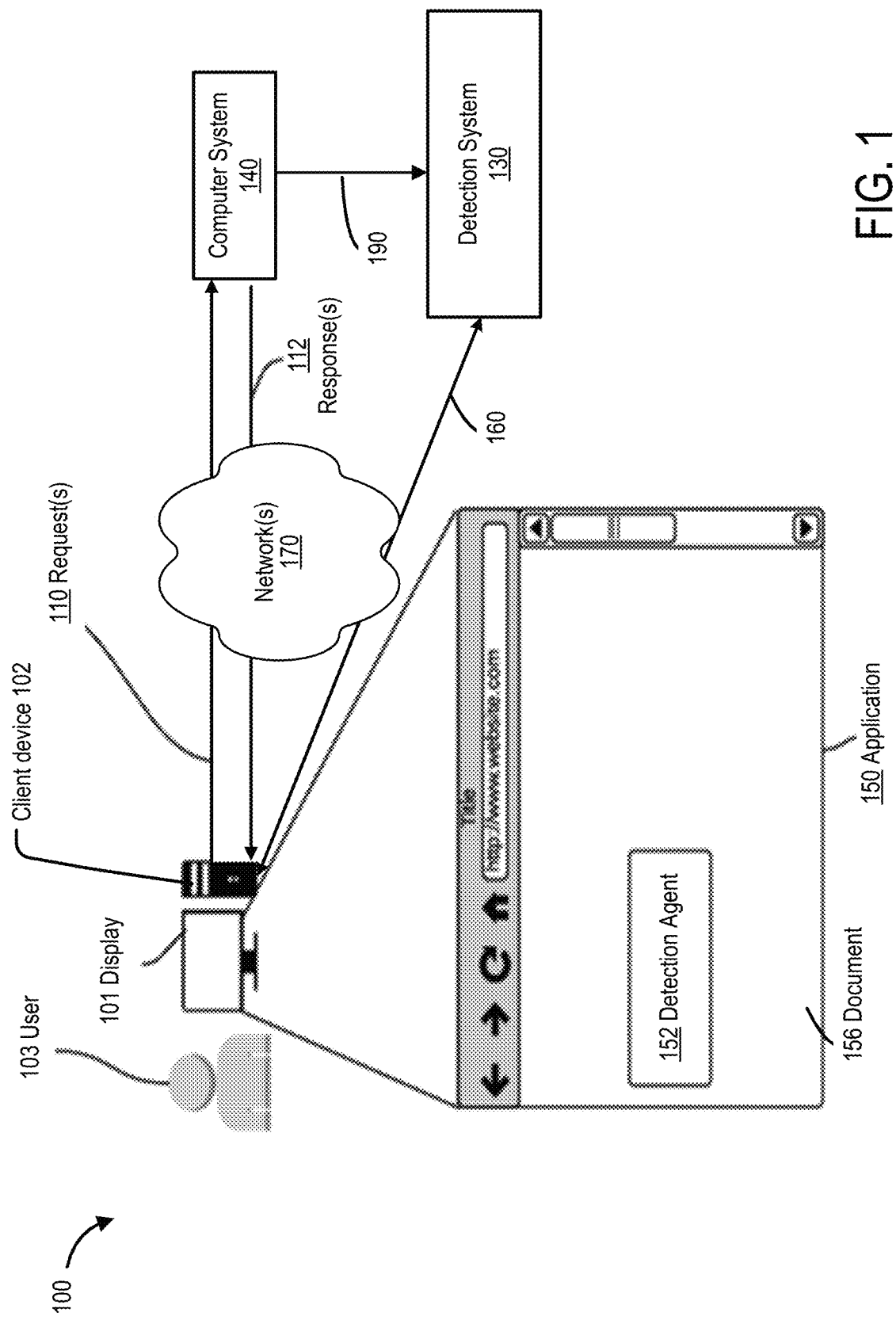
FIG. 1 illustrates a high-level architectural diagram of a system for detection of events according to embodiments.

Prior to further describing embodiments of the disclosure, description of related terms is provided.

A "user" may include an individual that uses a website using a user device. The user may also be referred to as a "consumer" or "customer" depending on the type of the website.

A "client device" may comprise any suitable computing device that can be used for communication. The client device may be a computing device of a user accessing a website.

A "user device" may comprise any suitable computing device that can be used for communication. A user device may also be referred to as a "communication device." A user device may provide remote or direct communication capabilities. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of client devices include desktop computers, mobile phones (e.g., cellular phones), PDAs, tablet computers, net books, laptop computers, etc. Further examples of user devices include wearable devices, such as smart watches, fitness bands, ankle bracelets, etc., as well as automobiles with remote or direct communication capabilities. A user device may comprise any suitable hardware and software for performing such functions, and may also include multiple devices or components (e.g., when a device has remote access to a network by tethering to another device—i.e., using the other device as a modem—both devices taken together may be considered a single communication device). The user device may be used to contact a user assistance system, and may be the same as a client device used to access the website.

A "server computer" may include a powerful computer or cluster of computers. For example, the server computer can be a large mainframe, a minicomputer cluster, or a group of computers functioning as a unit. In some cases, the server computer may function as a web server or a database server. The server computer may include any hardware, software, other logic, or combination of the preceding for servicing the requests from one or more other computers. The term "computer system" may generally refer to a system including one or more server computers.

A "processor" or "processor circuit" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron, etc.; IBM and/or Motorola's PowerPC; IBM's and Sony's Cell processor; Intel's Celeron, Itanium, Pentium, Xeon, and/or Xscale, etc.; and/or the like processor(s).

A "memory" or "system memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "session" or a "web session" general refers to a set of user interactions with a website, which can include any user-accessible server, e.g., that may be accessed by a browser or native application. The session may include interactions starting with a user accessing a webpage of the website (e.g., using a web browser or other software application, e.g., a native application) and ending with the user ceasing interactions with the website (e.g., closing a webpage of the website within the web browser or software application). The time-length of the session in seconds, minutes, and/or hours can be determined based on a start time when the user first interacted with the website to an end time of the last interaction made by the user. The web server hosting the website may store an identifier of the session and other information associated with the session (e.g., elements or items of the website selected by the user, or information input by the user).

A "session event" or "web session event" (or just event) may be measured for a session of a user device with a website. Examples of session events include errors, clicks, or user-defined events. An anomalous event may refer to an event type that occurs too much or too little during a time-window relative to an expected amount (e.g., a historical amount) for the time-window.

"Webpage data" or "session data" may refer to data relating to a user interaction with a webpage during a session. The user interaction data can specify interactions (e.g., clicks, selections, cursor movement, input data, progress through a particular process) with the webpage.

"Assistance data" may refer to data received in relation to user communications with a user assistance computer. Assistance data can include, for example, a user's reason for contacting user assistance computer, a problem that the user is facing, a webpage identifier, resolution data provided by user assistance computer, etc. The assistance data may be obtained automatically (e.g., from a user device) or provided verbally or by text by the user.

"Key features" can include parameters of website data that comprise an increased likelihood of a user providing an assistance request. The key features can be identified by processing the webpage data using techniques as described herein. For example, key features can be identified from events that occurred in a session within a time window of receipt of an assistance request. As another example, the key features can be identified from events that occurred at an anomalous rate (e.g., during a time period, such as the time window in the previous example) that deviates from an expected amount based on historical web sessions. As yet another example, the key features can be identified from events that are correlated with web sessions that do not reach a target stage of the website. As yet another example, the key features can be identified as occurring in web sessions corresponding to assistance requests at a frequency above a threshold relative, e.g., relative to web sessions not having assistance requests or within a frequency range between a minimum (not an outlier) and maximum (not a common feature, which would be unrelated to a website problem).

"Resolution data" may refer to data that can be used to determine a resolution of a problem a user is encountering with a website. For example, the resolution data can include a course of action, which can resolve a problem, such as an error message, encountered by the user. As another example, the resolution data can comprise summary information derived from the one or more key features. The summary information can include, for example, data that is relevant to the user assistance computer in providing assistance to the user of the user device.

The term "providing" may include sending, transmitting, displaying or rendering, making available, or any other suitable method. While not necessarily described, messages communicated between any of the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

DETAILED DESCRIPTION

The Internet continues to expand every day with more websites and enhancements to technology to improve navigation of content within a website. The increase in websites and the change in technology may contribute to an increase in user frustration for navigating many websites. It is difficult, if not impossible, for a software developer to predict or test for all possible problems that might be encountered by a user, with consequences that a business must also provide user assistance as a separate channel to help a user of a website.

Embodiments of the present disclosure can monitor web pages using data from clients and servers, and mining such data to identify patterns of problems that occur, e.g., that a certain series of network requests, certain error messages, or user interactions have a high likelihood of resulting in a call for user assistance. Such prior data mining can help in preparing real-time summaries of relevant information (e.g., likely triggers of the problems and possible solution), since problematic patterns have already been identified, thereby transforming a time consuming process into an efficient query to a pattern database.

In some embodiments, a detection system can receive data relating to events (e.g., frustration events, error events, etc.) during navigation of electronic documents (e.g., webpages) from servers (e.g., websites). By monitoring the interaction with a document and other events related to functionality for the document, a detection system can detect events in which users are struggling (e.g., experiencing lack of response or limiting functionality) to interact with the document, the webpage generates an error message, etc., thereby causing the users to contact a user assistance system. Data from the user assistance system can be correlated with interactions with the documents to identify interaction patterns indicating contact with the user assistance system is likely.

The aggregated data may enable the detection system to determine statistical information about the events, such as the likelihood the issue results in assistance request, thereby enabling the detection system to be ready to provide related information, e.g., to the user, to the user's computer, or to a user assistance system. Such related information can include: (1) information about a current state of the document (e.g., recent history of user interaction with a web page), particularly parameters of the current state that are highly correlated to assistance requests; (2) possible problems that the user might be having with document, and (3) solutions (resolutions) to the possible problems. Thus, in some embodiments, the detection system can identify which resolutions provided to the user by a user assistance computer correspond to which events. Further, in some embodiments, the detection system can send resolution data to a server associated with the website, where the resolution data has a certainty level of being related to an error in webpage data as determined using key feature(s).

The following paragraphs relate to monitoring user interactions with a website, processing the webpage data to identify key features in the webpage data, and determining resolution data based on the identified key features.

I. Monitoring of User Interactions with a Website

FIG. 1 illustrates a generalized example of a system 100 as a high-level architectural diagram for a detection system. One or more of the below-described techniques may be implemented in or involve one or more computer systems. System 100 is not intended to suggest any limitation as to scope of use or functionality of described embodiments.

The system 100 may include one or more "clients" or client systems (e.g., client application or client device), such as a client device 102. System 100 may include a computer system 140 (e.g., a web server computer). Clients may be operated by users, such as user 103. Computer system 140 may be operated by a user (e.g., an administrator). Clients can communicate with computer system 140 to exchange data via one or more communication networks (e.g., a network 170). Examples of a communication network include, without restriction, the Internet, a wide area network (WAN), a local arear network (LAN), an Ethernet network, a public or private network, a wired network, a wireless network, and the like, and combinations thereof.

Communications between clients and computer system 140 may include one or more requests 110 and/or one or more responses 112. A communication session (e.g., a web session) may be established between client device 102 and computer system 140 to exchange communications via network 170. Computer system 140 may be implemented to store electronic documents, such as a collection of web documents for a website. In some embodiments, clients may communicate with computer system 140 by transmitting a request 110 along network 170 to computer system 140. For example, a request from client device 102 to computer system 140 may be a request for an electronic document (e.g., a webpage) accessed from a URL at client device 102. A response 105 from a computer system 140 to client device 102 may be a response providing the webpage requested by client device 102. The communications exchanged in system 100 may be transmitted via one or more data packets. Data packet(s) that are received may be reassembled to yield a communication, such as a request or a response. Requests and responses may be transmitted via one or more network devices.

Requests and responses may include data, such as consumer data and/or enterprise data. The data may include an electronic document (also referred to herein as "a document"). Data as disclosed herein may be referred to as "cloud data," which is distinguishable as data in a cloud-based environment. An electronic document (also referred to herein as a "document") accessed on the Internet (e.g., the web) may be referred to herein as a document of a website. For example, an electronic document may be a "web document" or a "webpage" of a website. Data may be received from a computer system, data may be sent to a computer system, data may be processed by a computer system, or combinations thereof. Cloud data and/or enterprise data may be distinguishable from consumer data for consumer applications and/or services. Cloud data may include data accessed in a system including an enterprise system.

In certain embodiments, data may include data processed, stored, used, or communicated by an application or a service executing in a computer system. For example, data includes objects. Data may be in a format, such as a JSON (JavaScript Object Notation) format from enterprise applications. Data may include structured data (e.g., key value pairs), unstructured data (e.g., internal data processed or used by an application, data in JSON format, social posts, conversation streams, activity feeds, etc.), binary large objects (BLOBs), documents, system folders (e.g., application related folders in a sandbox environment), data using representational state transfer (REST) techniques (referred to herein as "RESTful data"), system data, configuration data, synchronization data, or combinations thereof.

In some embodiments, data in communications 110, 112 may include a resource such as a document as referenced herein. A resource, such as a document, may include a document extended markup language (XML) files, HTML, files (e.g., a webpage), JavaScript files, visual assets, configuration files, media assets, a content item, etc., or a combination thereof. For example, a resource may be a webpage in an HTML format referenced by uniform resource information (URI), e.g., a uniform resource locator (URL). A BLOB may include a collection of binary data stored as a single entity in a database management system, such as an image, multimedia object, or executable code, or as otherwise known in the art.

System 100 can include a detection system 130 that performs techniques disclosed herein for detecting webpage data (e.g., events) associated with web sessions involving a website. In some embodiments, a detection system may be implemented at client device 102, detection system 130, or a combination thereof. Detection system 130 may provide a service or an application that enables a user to detect events. Detection system 130 may be implemented as part of client device 102, computer system 140, or a combination thereof. Detection system 130 may be communicatively coupled (e.g., via a network 170) to one or more elements in system 100. For example, detection system 130 may be communicatively coupled to client device 102 via connection 160 through network 170. Detection system 130 can be communicatively coupled to computer system 140 via network 170, e.g., depicted as connection 190. Such connections (e.g., 160 and 190) may occur through a common network device or via different network devices.

Detection system 130, computer system 140, and client device 102 may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Detection system 130 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like. Detection system 130 may be implemented using hardware, firmware, software, or combinations thereof. In one example, detection system 130 may include or implement a service (e.g., a Software as a Service, an Infrastructure as a Service, or a Platform as a Service) or a product (e.g., a computer program product) provided by Quantum Metric, LLC. In various embodiments, detection system 130 may be configured to run one or more services or software applications described in the foregoing disclosure. For example, detection system 130 may perform processing as disclosed herein according to an embodiment of the present disclosure.

Client device 102 may include or be coupled to a display 101. Client device 102 may provide access to one or more applications, such as application 150. Application 150 may be a browser enabling user 103 to view resources, such as documents. In at least one embodiment, system 100 may include an agent 152 ("detection agent") that can detect events in system 100. Detection agent 152 may operate in communication with detection system 130 to provide a service or an application that enables a user to detect events.

Detection agent 152 may be implemented with program code (e.g., an application) that resides on client device 102, detection system 130, computer system 140, or a combination thereof. For example, detection agent 152 may be implemented using JavaScript that is embedded in a document (e.g., webpage 156) of a website that can identify and obtain data that is displayed at client device 102. Detection (capture) agent 152 may be client-side such that it is implemented at client device 102. Detection agent 152 can be sent in communications to client device 102. For example, the detection agent 152 can be retrieved from a third party server (e.g., from detection system 130) according to a link provided in the website provided from content computer system 140. Detection agent 152 may communicate with detection system 130 to coordinate event detection. Detection agent 152 may perform operations disclosed herein as being performed by a client. In some embodiments, detection agent 152 may be received from detection system 130. Detection agent 152 may be deployed to client device 102 as part of a service provided by detection system 130. Detection agent 152 may be configured for communication with detection system 130. Detection agent 152 may gather data on behalf of detection system 130. In some embodiments, detection agent 152 may perform specialized functions to gather and prepare data in a format for detection system 130 to process in detecting events.

Agent 152 may have more or fewer subsystems and/or modules than shown in the figure, may combine two or more subsystems and/or modules, or may have a different configuration or arrangement of subsystems and/or modules. Subsystems and modules of agent 152 may be implemented in software (e.g., program code, instructions executable by a processor), in firmware, in hardware, or combinations thereof. The subsystems and/or modules of agent 152 may be implemented to perform techniques disclosed herein. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes disclosed herein. Agent 152 may store or be implemented as program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

In some embodiments, detection system 130 and client device 102 may be implemented using a computing system comprising one or more computers and/or servers that may include those described above. The computing system may be implemented as a cloud computing system. Detection system 130 and client device 102 may include several subsystems and/or modules, including some, which may not be shown. Detection system 130 may have more or fewer subsystems and/or modules than shown in the figure, may combine two or more subsystems and/or modules, or may have a different configuration or arrangement of subsystems and/or modules. Subsystems and modules of detection system 130 may be implemented in software (e.g., program code, instructions executable by a processor), in firmware, in hardware, or combinations thereof. The subsystems and/or modules of detection system 130 may be implemented to perform techniques disclosed herein. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes disclosed herein. Detection system 130 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

Detection system 130, client device 102, and agent 152, individually or in combination, may provide other services and/or software applications in a virtual or non-virtual computing environment. For example, detection system 130 may be configured to run one or more of these services or software applications described in the foregoing disclosure. Such services may be offered on-demand to users of client device 102. Services may be facilitated or accessed by agent 152. In some embodiments, a specific instantiation of a service provided by detection system 130 may be referred to herein as a "service." Users operating client device 102 may use one or more applications to interact to utilize the services or applications provided by detection system 130. Services may be offered as a self-service or a subscription. Users can acquire the application services without the need for customers to purchase separate licenses and support. Examples of services may include a service provided under a Software as a Service (SaaS) model, a web-based service, an enterprise service, a cloud-based service, or some other service provided to client device 102 via network 170. A service made available to a user via network 170 (e.g., a communication network) from detection system 130 is referred to as a "cloud service." In some embodiments, detection system 130 may host an application, and a user may, via network 170, access the application at client device 102 on demand. Users operating client device 102 may in turn utilize one or more applications to interact with detection system 130 to utilize the services provided by subsystems and/or modules of detection system 130.

In some examples, a service may be an application service may be provided detection system 130 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in detection system 130, which may be implemented as a cloud computing system. The cloud computing system may be implemented as a cloud-based infrastructure that is accessible via network 170. Various different SaaS services may be provided.

Detection system 130, client device 102, and agent 152 may each also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, detection system 130 may be coupled to or may include one or more data stores. The data store(s) may store templates, edit scripts, and other information for the operations disclosed herein. The data store(s) may be implemented to store data using one or more data structures (e.g., a hash table).

The data store(s) may be accessible to perform search and retrieval of data stored in the data store(s). The data store(s) may store data to perform event detection and to store information about detected events as disclosed herein. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

In at least one embodiment, a web session may begin with a user 103 on a web browser 150 initiating the browser request 110 for a document 156 from computer system 140. The user 103 may initiate the browser request 110 on a client device 102.

Once the computer system 140 has received the request, it may transmit a response 112 and return to the client device's 102 web browser 150. The response 112 of the computer system 140 may include the web document 156 requested by the user 103. The computer system 140 may further include within the response 112 a Document Object Model (DOM), such as a hypertext markup language (HTML) DOM. The document 156 may be rendered according to the DOM. In one embodiment, the web document 156 may contain a reference to the detection agent 152 (e.g., JavaScript code), which can then be fetched as a result from detection system 130. The detection agent 152 could also be sent separately from the web document 156. Regardless, the detection agent 152 would be sent in conjunction with the web document 156, such that the detection agent 152 can detect information about and operation of a website including the web document 156. Being configured for communication with the detection system 130, the detection agent 152 can provide the detection system 130 with data detection of interaction with and operation of a website. Detection agent 152 can monitor interaction with a website via input to a client and can monitor operation of the website with respect to functions for displaying the website and/or communication with a host system hosting the website. As discussed below, detection system 130 operating with detection agent 152 can detect events related to operation of and/or interaction with a website to identify events that may cause to operation and/or performance of the website.

The detection agent 152, detection system 130, or a combination thereof may perform operations disclosed herein to detect events and to record information about those events. Information about events may be stored by the detection system, presented in a graphical interface at a client device/computer system, and/or communicated to another system, such as computer system 140 that provides documents for a website.

The processes and/or operations disclosed herein may be performed by detection agent 152, detection system 130, or a combination thereof. Detection agent 152 and detection system 130 may communicate with each other as part of performing event detection. Examples disclosed herein may be described as a process, which may be depicted as a flowchart, a flow diagram, a data flow diagram, a structure diagram, a sequence diagram, or a block diagram. Although such diagrams may describe operations as a sequential process, all or some of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function. Although some techniques may be described as being performed at one element of system 100, such as at a client 102 or detection system 130, the techniques may be performed in a variety of different combinations. For example, some or all of the features of detection system 130 may be implemented at a client device 102, or vice versa.

The processes disclosed herein may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in flowcharts herein can be implemented by one or more computer systems depicted in FIG. 1. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. While processing disclosed herein may be described with respect to a single document, such processing may be performed for multiple documents. Furthermore, additional steps may be added or removed depending on the particular applications. One of ordinary skill in the art would recognize many variations, modifications, and alternatives.

In at least one embodiment, a system can include one or more processors and a memory accessible to the one or more processors, the memory comprising instructions that, when executed by the one or more processors, cause the one or more processors to perform operations disclosed herein. In at least one embodiment, a computer product is disclosed comprising a computer readable medium storing a plurality of instructions for controlling a computer system to perform an operation of any of the method disclosed herein. A system is disclosed herein including a computer product implementing any of the operations disclosed herein, and including one or more processors for executing instructions stored on the computer readable medium included in the computer product. In some embodiments, a system can include means for performing any of the methods disclosed herein. In some embodiments, a system can be configured to perform any of the methods disclosed herein. In at least one embodiment, a system can include modules that respectively perform the steps of any of the methods disclosed herein.

In an aspect of some embodiments, each process disclosed herein can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

II. User Assistance System

When a user encounters a problem with a website, the user may seek user assistance to resolve the issue. Such issues could occur for ecommerce websites where users purchase items, insurance websites, banking websites, etc, as well as gaming websites, websites for non-profits that provide data to volunteers, etc.

Figure 2:
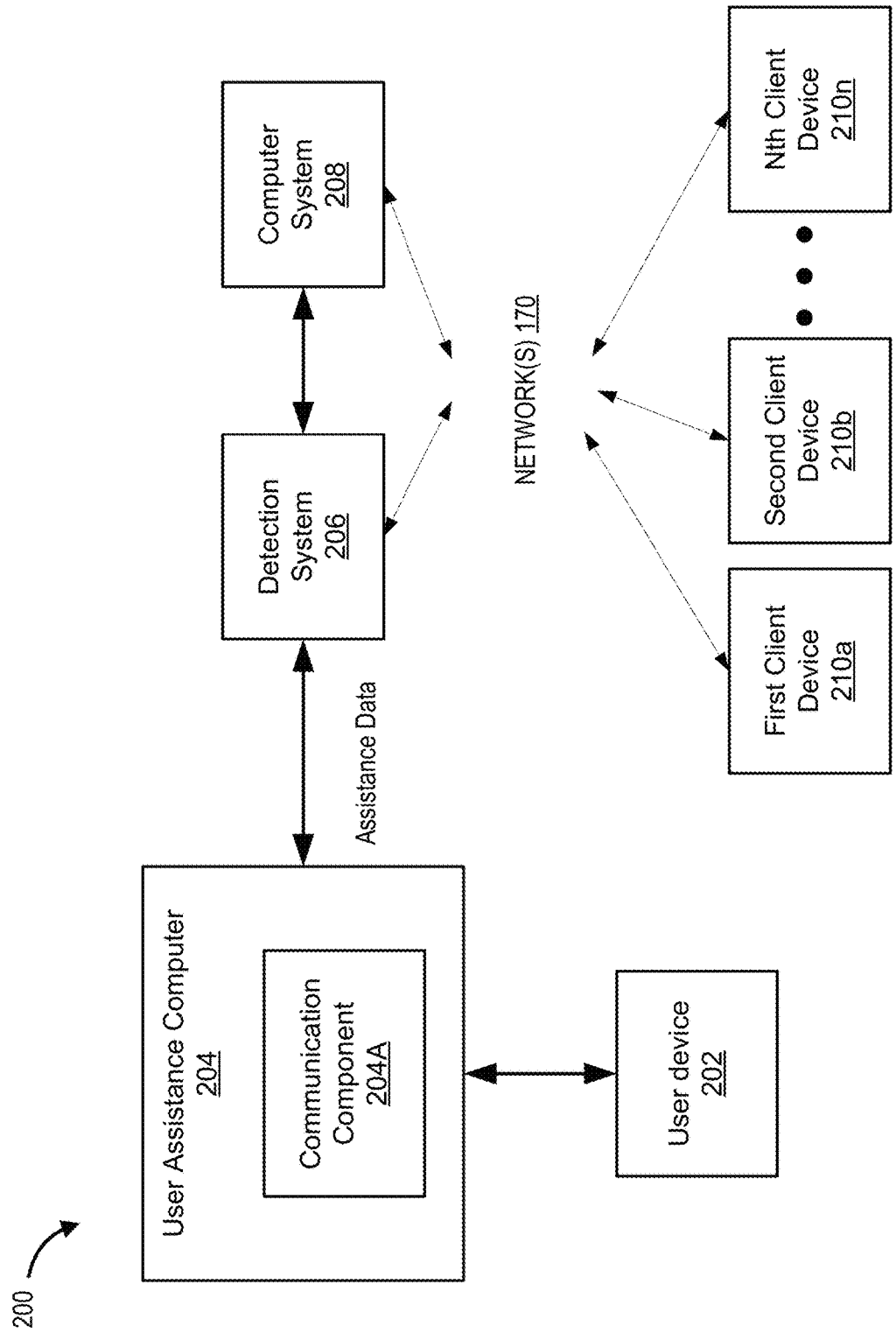
FIG. 2 illustrates a block diagram of a user assistance system according to embodiments.

FIG. 2 shows a block diagram of a user assistance system 200 according to embodiments. System 200 can include a user device 202, a user assistance computer 204, a detection system 206, a computer system 208, and one or more client device(s) 210a-n.

Client device 210a-n can be client device 102 of FIG. 1. For example, a user may operate client device 210a. The client device 210a-n can include any N number of devices and can communicate with a computer system 208 to, for example, access a webpage. The webpage may be stored by computer system 208 and/or a database associated with computer system 208. Client device 210a-n can generate and transmit a request message to computer system 208. The request message can include a request for an electronic document (e.g., a webpage) accessed from a URL at client device 210a-n. Computer system 208 can generate and transmit a response message to client device 210a-n. The response message can be a message that provides the webpage requested by client device 210a-n.

Detection system 206 can be detection system 130 of FIG. 1 and can receive any suitable data from computer system 208 and/or client device 210a-n regarding, for example, user activity on the webpage. For example, data may be provided to detection system 206 using a detection agent that may be implemented using JavaScript that is embedded in a document (e.g., webpage) of a website that can identify and obtain data that is displayed at client device 210a-n, as described herein. However, it is understood that detection system 206 can receive any suitable data regarding the user, the webpage, client device 210a-n, computer system 208, etc. in any suitable manner.

During use of the webpage, the user of any client device 210a-n may encounter a problem with the webpage. The user can use a user device 202 to communicate with a user assistance computer 204 regarding the problem. User device 202 can include a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. User device 202 may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A user of user device 202 may utilize user device 202 to communicate with user assistance computer 204, which can be specifically associated with computer system 208. For example, a company (e.g., airline, bank, etc.) can operate a website on computer system 208 and run a call-in center in which user assistance computer 204 resides. In some embodiments, user device 202 may be a phone. The user of user device 202 may call a phone number associated with user assistance computer 204. For example, a user may be experiencing a problem with a webpage being accessed by a first client device 210*a*. The first client device 210*a* may also be operated by the user of user device 202. In some embodiments, user device 202 and client device 210*a-n* can be the same device. For example, a user can utilize the first client device 210*a*, which may be a laptop, to access a webpage provided by computer system 208. The user may encounter a problem with the webpage and may then communicate with user assistance computer 204. The client device 210*a-n* may directly communicate with user assistance computer 204 over the Internet, for example.

User assistance computer 204 can be configured to accept calls from a plurality of user devices. User assistance computer 204 can comprise a communication component 204A. For example, communication component 204A can include any suitable means of communication. Communication component 204A can include a phone that can be operated in conjunction with user assistance computer 204 by an operator. In some embodiments, communication component 204A can comprise a means of internet communication. For example, an operator of user assistance computer 204 can communicate with a user of user device 202 via a text based chat included in a webpage.

User assistance computer 204 can comprise a number of additional components not shown in FIG. 2. For example, user assistance computer 204 may comprise a processor. The processor may be coupled to a memory, a network interface, input elements, output elements, a computer readable medium, and/or any other suitable components.

The memory of user assistance computer 204 can be used to store data and code. The memory may be coupled to the processor internally or externally (e.g., cloud based data storage), and may comprise any combination of volatile and/or non-volatile memory, such as RAM, DRAM, ROM, flash, or any other suitable memory device.

The one or more input elements of user assistance computer 204 may include any suitable device(s) capable of inputting data into user assistance computer 204. Examples of input elements include buttons, touchscreens, touch pads, microphones, etc. The one or more output elements of user assistance computer 204 may comprise any suitable device (s) that may output data. Examples of output elements may include display screens, speakers, and data transmission devices The network interface of user assistance computer 204 may include an interface that can allow user assistance computer 204 to communicate with external computers. The network interface may enable user assistance computer 204 to communicate data to and from another device (e.g., the user device 202, detection system 206, etc.). Some examples of the network interface may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface may include Wi-Fi™. Data transferred via the network interface may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

When a user contacts user assistance computer 204, user assistance computer 204 can receive an assistance request from user device 202. User assistance computer 204 can store assistance data related to the request. For example, identification data of the user can be stored, such as name, phone number, email, username, etc. A time of the request can also be obtained. Other information can include a particular page of the website where a problem was encountered, as well as action(s) that resolved or did not resolve the problem. Such assistance data can be provided from user assistance computer 204 to detection system 206, which can correlate the status of the interaction of client device 210*a-n* with computer system 208 to the assistance request. The data can be provided on-demand when an assistance request is provided by user device 202. The assistance computer 204 can forward information relating to the user assistance session to the detection system 206. The detection system 206 can identify the web session (e.g., a web session record with webpage data) that corresponds to the assistance data. The detection system 206 can generate resolution data (e.g., summary data) relating to the session by correlating a particular one of the client devices 210*a-n* with the assistance request. Such correlation or matching is described in more detail in a later section. In this manner, detection system 206 can identify one or more patterns of website interactivity that has a sufficient likelihood (e.g., above a threshold) for resulting in an assistance request from a user. Further details are described below.

Embodiments provide for a number of advantages. For example, according to previous systems and methods, a user may contact a customer service representative for assistance with a website. Such human interaction is expensive and can be time consuming for the representative and the user. The customer service representative may not have information regarding the user's recent activity on the website and may require the user to communicate what they believe to be their problem. This can lead to delays in resolving an error with the website since the user needs to discuss with the customer service representative. Accordingly, improved techniques as described herein are able to facilitate users with resolving problems encountered with dynamic network documents, e.g., web pages.

However, a solution of simply providing a recording of the user's, for example, last 30 minutes of activity on a website to a customer service representative may not be efficient. This allows the customer service representative to watch the recording to determine the cause of the error, rather than relying on the user to communicate what the error might be. However, this includes the customer service representative placing the user on hold for 30 minutes, as the recording is reviewed. Embodiments provide improved techniques for coordination among detection systems and user assistance system to provide relevant and timely information for identifying problems associated with a website, e.g., as may occur from network errors, software errors, and user errors, as well as possible resolution actions. Further details regarding such coordination, error detection, and resolution are described below.

III. Detection System

The detection system can correlate instances of assistance requests to specific states of a website (e.g., certain API calls, errors messages, stage in a process flow of a user on a web page, e.g., part of a payment transaction or registration, etc.). The correlation can provide key features (parameters) of webpage data that likely relate to reasons users to make assistance requests. The webpage data can specify a state of a website on the user computer, such as network requests to other computers. The website states can be defined by a DOM, a status of network requests, and/or any user interaction data. Armed with such information, the detection system can quickly provide relevant information to a user assistance computer or to the user's client computer. For instance, the detection system can provide, to the user assistance computer, the key features and/or actions to resolve the issue (e.g., resolution data). In this manner, the representative at the user assistance computer can quickly resolve the problem. The identification of key features webpage data is described in more detail in a later section.

Figure 3:
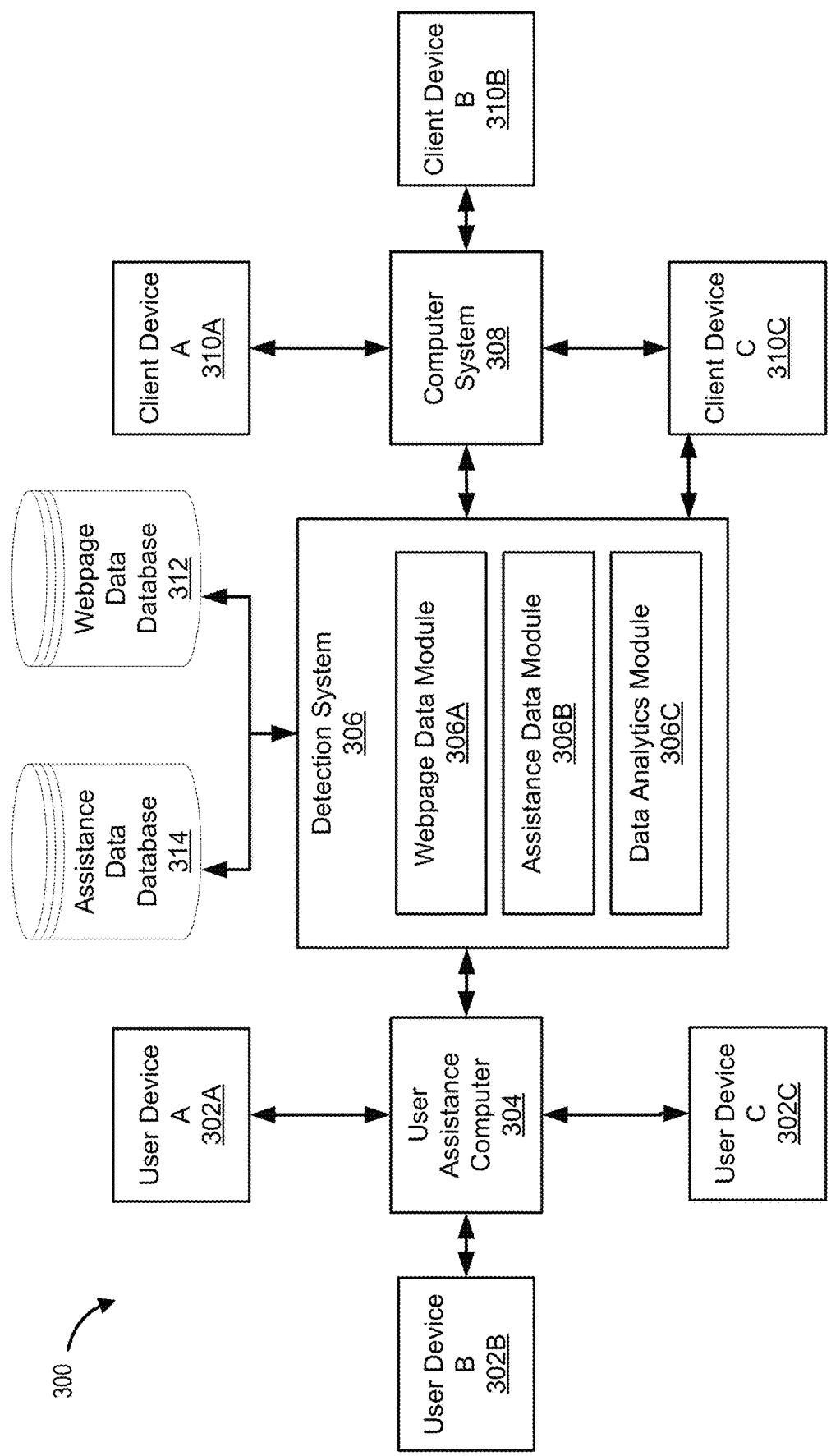
FIG. 3 illustrates a block diagram of a data analysis system according to embodiments.

FIG. 3 shows a block diagram of a data analysis system 300 according to embodiments. System 300 can include plurality of user devices (e.g., user device A 302A, user device B 302B, and user device C 302C), a user assistance computer 304, a detection system 306, a computer system 308, a plurality of client devices (e.g., client device A 310A, client device B 310B, and client device C 310C), a webpage data database 312, and an assistance data database 314.

Detection system 306 can be in operative communication with user assistance computer 304, computer system 308, webpage data database 312, and assistance data database 314. Detection system 306 can comprise a processor, which may be coupled to a memory and a computer readable medium. The computer readable medium can comprise a plurality of modules (e.g. software modules). For example, the modules can include webpage data module 306A, assistance data module 306B, and data analytics module 306C. Webpage data module 306A can be used in conjunction with monitoring of user interactions with a website, e.g., as described for FIG. 1. Assistance data module 306B can be used for collecting information about assistance requests that users make to an assistance system, e.g., as described in relation to FIG. 2. Data analytics module 306C can analyze the webpage data and the assistance data to correlate assistance requests to particular webpage data, e.g., to identify key features of the webpage data that have a sufficient likelihood of resulting in an assistance request.

A. Webpage Data

Webpage data module 306A may comprise code or software, executable by the processor, for obtaining and/or pre-processing webpage data. Webpage data module 306A, in conjunction with the processor, can receive data relating to a webpage, a computer system, and/or a client device. For example, webpage data module 306A, in conjunction with the processor, can receive event data comprising a user's interactions with a webpage. Such event data and other webpage data for a web session can be obtained as described in FIG. 1, e.g., using a detection agent (e.g., detection agent 152). As examples, the user's interactions can include clicks, selections, cursor movement, input data, progress through a particular process, etc. In some embodiments, webpage data module 306A, in conjunction with the processor, can be configured to perform any suitable pre-processing of data. For example, webpage data module 306A, in conjunction with the processor, can remove data, add identifiers to the data, etc.

Webpage data database 312 can comprise any suitable data relating to a website having one or more webpages. The webpage data database 312 can store website data and corresponding user identifiers and client device identifiers, as well as session identifier. Thus, the webpage data database 312 can have records for a user, a client device, and for each of one or more sessions of a user; and the fields in each of the records can include value that may be used to identify related records. The webpage data can comprise data relating to a user's interaction with a webpage. For example, webpage data can include user actions (e.g., mouse movements, webpages selected by the user), generated error messages, user identifiers (e.g., username, phone number, etc.), webpage identifiers (e.g., webpage address, uniform resource locator (URL) address), client device identifiers (e.g., device internet protocol address, device media access control (MAC) address, device type), API calls to third party servers, etc.

B. Assistance Data

Assistance data module 306B may comprise code or software, executable by the processor, for obtaining and/or pre-processing assistance data. Assistance data module 306B, in conjunction with the processor, can receive data relating to user assistance from user assistance computer 304. For example, assistance data can include any suitable data received in regards to a user's communications with a user assistance computer. Assistance data can include, for example, a user's reason for contacting user assistance computer 304 (e.g., obtained from the user during the user communication with the user assistance computer in audio or text data), a problem that the user is facing (e.g., as defined by text provided to the user assistance computer 304, chosen from a list of potential problems), a webpage identifier, and resolution data (e.g., derived from extracted features of webpage data) provided by user assistance computer 304. The assistance data can also include any of a user identifier, a client device identifier, and a session identifier. Such data can be utilized in identifying a web session that correlates to the assistance request provided by the user. In some embodiments, assistance data module 306B, in conjunction with the processor, can be configured to perform any suitable pre-processing of data. For example, assistance data module 306B, in conjunction with the processor, can remove data, add identifiers to the data, etc.

In some embodiments, the assistance data may comprise a user identifier, for example, a phone number, email address, username, user device identifier, etc. The detection system 306 can associate (correlate) the assistance data with received webpage data by identifying common information among the two sets of data. In a first example, the detection system 306 can obtain an identifier (e.g., an email address) and identify all recent sessions relating to the user. The detection system 306 can list the prior sessions to an assistance computer 304. In another example, the user identifier can be provided directly to the assistance computer 304 to provide the current session at the assistance computer 304. In some instances, a client device identifier can be used for session identification if a user is not logged into the webpage. The session and client device identifiers can be presented directly to the user when seeking assistance and the assistance agent can ask for that code to send to the detection system for matching.

For example, a user may receive an error message on client device A 310A when accessing a webpage provided by computer system 308. The webpage data including the error message, a user identifier, and events that occurred during the user's interaction with the webpage can be provided to detection system 306, e.g., via a detection agent. The user can then communicate with user assistance computer 304 with user device A 302A (or client device A 310A, in some embodiments). User device A 302A can provide a user identifier and a message (e.g., a message describing the error encountered by the user) to user assistance computer 304 using the user device 302A via audio data or via text data (e.g., in a chat message displayed on the user device 302A).

User assistance computer 304 can provide any suitable assistance to the user. For example, user assistance computer 304 can determine resolution data for the error message by extracting features from the webpage data and identifying the resolution data from the extracted features. User assistance computer 304 can provide assistance data to the detection system 306 comprising the user identifier as well as an action, which resolved the error to detection system 306. Upon receiving the assistance data, the detection system 306 can identify the webpage data (e.g., using a session identifier or a client device identifier) that includes a matching user identifier. The detection system 306 can then label the webpage data with any suitable label (e.g., a flag in a field) indicating that the user contacted user assistance computer 304.

Assistance data database 314 can comprise any suitable data relating to user assistance, user assistance computer 204, user device 202, etc. For example, assistance data can comprise data relating to a user's communication with a user assistance computer, as well as user reported errors and error messages, user identifiers, and resolution data created based on a resolution provided by the user assistance computer to the user to resolve an error encountered by the user on the webpage.

The resolution data can include a selection from a drop down menu of possible solutions. For example, an operator of the user assistance computer can select a resolution that was provided to the user and resolved the user's problem. In some embodiments, resolution data can include any suitable data that describes a solution, or potential solution, to an error which caused the user to contact the user assistance computer. Webpage data database 312 and assistance data database 314 can include any suitable database. As an example, a database may be a conventional, fault tolerant, relational, scalable, secure database such as those commercially available from Oracle™ or Sybase™

C. Analytics Module

1. Identifying Key Features

Data analytics module 306C may comprise code or software, executable by the processor, for performing a machine learning method and/or other suitable data analysis with data obtained from user assistance computer 304 and/or computer system 308. The detection system 306 can identify one or more key features (e.g., as a pattern) based on the assistance data and the webpage data. For example, a key feature can occur in the webpage data associated with assistance requests with sufficient frequency, e.g., at least a specified amount (such as a threshold) of web sessions with the key feature and an assistance request. In some embodiments, the key features can relate to parameters of webpage data that likely relate to reasons users to make assistance requests. The webpage data can include any suitable website states from which key parameters can be determined, for example, webpage data can include certain API calls, error messages, stages in a process flow of a user on a web page, etc.

As an example of correlating assistance requests to particular web sessions, the detection system 306, can label instances of webpage data that correspond to assistance data. Such labeling can be performed in various ways. For example, user identification data (e.g., phone number, user name, email address, etc.) in the assistance data database 314 can be matched to user identification data for respective web sessions in webpage data database 312. In many instances, exact matching may not be required, as elements in each entry can be compared to identify a number of similarities between the entries (e.g., to determine if the number of similarities between the entries exceeds a threshold). The matching can use times for entries in each database, so that the assistance data for a particular request can be matched to the webpage data for the corresponding client device of the user just before the user requested assistance. For instance, a time and user identification of a particular assistance request can be used to search webpage data database 312, and the resulting webpage data can be labeled as corresponding to the particular assistance request.

Data analytics module 306C, in conjunction with the processor, can perform a clustering process to determine patterns, for example, that are indicative of which webpage data (e.g., errors, API calls, page or stage of a flow of a website, etc.) result in users contacting user assistance computer 304. For example, clustering can include the task of grouping a set of objects in such a way that objects in the same group (called a cluster) are more similar (in some sense) to each other than to those in other groups (clusters). In the clustering, each multidimensional data point can correspond to an assistance request, and each dimension corresponds to a different feature (parameter) defining the webpage data associated with the assistance request, e.g., the webpage data within a specific time period before the assistance request). In some implementations, if a given feature is shared among at least a specified percentage of assistance requests, then it can be identified as a key feature.

In other implementations, clusters of points can be identified, and the frequency of a given feature shared among the points of a cluster. Thus, the denominator in the frequency determination may not be all assistance requests but only those that are part of the cluster. In this manner, such a key feature may be identified in conjunction with one of a set of other parameters of the webpage data. Profile data of a user may also be used to filter the assistance requests that are analyzed to determine if a particular feature occurs with sufficient frequency to identify as a key feature (e.g., relative to all sessions or ones that do not result in an assistance request). As another example, a key feature can occur within a frequency range between a minimum (not an outlier) and maximum (not a common feature, which would be unrelated to a website problem). Such minimum and maximum thresholds can be in numbers or percentages. Example minimum percentages include 0.1%, 0.2%, 0.5%, 1%, 2%, 3%, etc. Example maximum percentages include 5%%, 10%, 15%, 20%, 25%, etc. A set of features can also be identified as occurring together as a specific pattern, e.g., all are required, as opposed to one key feature that occurs with any one of a set of features.

In some embodiments, data analytics module 306C, in conjunction with the processor, can perform principal component analysis (PCA). PCA can include a statistical procedure that uses an orthogonal transformation to convert a set of observations of possibly correlated variables into a set of values of linearly uncorrelated variables called principal components. PCA may be utilized to reduce a number of variables (e.g., features from webpage data) and may ensure that resulting variables are independent. For example, a matrix may be generated by data analytics module 306C. The matrix can indicate how each variable relates to one another. For instance, the matrix can include relations between variables such as API calls, webpage identifiers, presented media (e.g., video, pictures, etc.), page or stage of a flow of a website, error messages, etc. Data analytics module 306C can break the matrix down into separate components of direction and magnitude. The direction may be indicative of dimensionality, whereas magnitude may be indicative of an importance of the corresponding dimensionality. The data analytics module 306C can remove directions that are least important (e.g., have a lowest value of magnitude). For example, one direction may correspond (e.g., be created from) to the variables of font type and background color. The magnitude determined for this direction may be a smaller value than a magnitude for a directions corresponding to error messages and API calls. The data analytics module 306C can then determine to remove the direction corresponding to font type and background color while retaining the direction corresponding to error messages and API calls as well as other directions. This may be due to the font type and background color having little effect on users contacting the user assistance computer 304.

As an additional example, a webpage may be outputting many API errors when calling a non-function critical API (e.g., an API call to an advertisement has failed). A large number of users may utilize the webpage, but may not contact a user assistance computer due to not seeing an advertisement. In this example, detection system 306 can perform a clustering process with data based on received webpage data comprising API errors and received assistance data. Detection system 306 can determine that the API errors calling a non-function critical API are distributed amongst users that contact user assistance computer 304 and users that do not contact user assistance computer 304. Detection system 306 can determine that webpage data that is labeled with the user contacting user assistance computer 304 is highly correlated with a particular error message (e.g., a web link not functioning). For example, a particular error message may occur in 85% of webpage data that is associated (e.g., labeled) with assistance data where the user contacted user assistance computer 304. In this way, detection system 306 can determine that users typically contact user assistance computer 304 when a particular error message is received in the webpage data. It is understood, however, that detection system 306 can cluster data around any suitable categories of webpage data and/or assistance data. The categories can relate to, for example, particular API calls, error messages that appear to the user's screen, information regarding at which point a user is at during a process (e.g., users are having problems with a starting page, an item selection page, a billing page, etc.), frustration events, a landing campaign, browser types, operating systems, etc.

2. Resolution Data

In some embodiments, data analytics module 306C, in conjunction with the processor, can output resolution data. In some embodiments, the resolution data can include a course of action, which can resolve a problem, such as an error message, encountered by the user. In other embodiments, the resolution data can comprise a summary (e.g., summary data). For example, the resolution data can comprise summary information derived from the one or more key features. The summary can include, for example, data that is relevant to the user assistance computer in providing assistance to the user of the user device. The summary can include one or more key features determined by detection system 306, or in some embodiments, one or more actions which may be performed by user assistance computer 304 and/or an operator thereof to solve the user's problem with the webpage. In some embodiments, the summary can be in any suitable format, for example, a sentence (e.g., created through a natural language processing method), a list of the key feature(s), etc. The summary data can be extracted from a session record that corresponding to the assistance data. A profile record can also be identified using the assistance data or data in the session record.

Features can be extracted, by data analytics module 306C, from the webpage data. Detection system 306 can then query a database (e.g., a key feature database) to identify one or more key features that occur in association with a population of assistance requests at a frequency above a threshold. The data analytics module 306C, in conjunction with the processor, can identify the resolution data based on the one or more key features. For example, the one or more identified key features can be used to query a resolution database to retrieve resolutions data that is associated with each of the key feature(s). Entries in the resolution database can be created responsive to a resolution being associated with an assistance session, which can include the webpage data (including any key features) as provided by the detection system. Once a resolution action is associated with an assistance session, that resolution action can automatically be assigned to any one of the key feature(s) of that session or to all of them collectively. Such connections/assignments can then be sent from the user assistance computer 304 to detection system 306 for inclusion into the assistance data database, which can include the resolution database.

As an example, a key feature may be a particular API call. The API call may be causing a portion of a webpage to not load correctly, thus leading to more users contacting user assistance computer 304. Based on API cell being a key feature (e.g., in a key feature table), detection system 306 can identify corresponding resolution data (e.g., in a resolution table that includes key features and resolutions), where the resolution data may comprise a summary. The correspondence of resolutions and key features can be determined based on assistance data provided by the user assistance system, where the assistance data (including the resolution data) of sessions is correlated to webpage data of those sessions. The summary can describe relevant information regarding the particular API call which has failed. In some embodiments, detection system 306 can provide the summary to user assistance computer 304. An operator of user assistance computer 304 can communicate with the user regarding the summary provided to the operator. By doing so, the operator is able to quickly learn of the problem encountered by the user based on the resolution data.

The summary data can tale various forms. As examples, the summary data can specify a landing page during a session with a user, specify a number of interactions with the webpage (e.g., clicks, mouse movements, time on each webpage), and specify a last page visited during the session. The summary data can specify a series of page paths across multiple webpages that occurred during a session with the user. The summary data can be extracted from a session record that corresponding to the assistance data. A profile record can also be identified using the assistance data or data in the session record.

In some instances, the summary data can illustrate various user details (e.g., historical webpage data, past purchasing history, webpage visit count/frequency, client device traits (e.g., operating system, browser, device type)). The summary data can also show a journey progression through a website or mobile application using the page paths visited in the webpage data. In some embodiments, the summary data can identify known ongoing performance incidents occurring on the website.

The series of events can be played back in chronological order to reproduce the user journey across the webpages during a session. Replaying the series of events can be utilized in subsequent review of the series of events to identify/verify the key features and/or the resolution data for an assistance request. The events that are identified as described herein can be highlighted or otherwise indicated as being events that may relate to the error specified in the assistance request. A file or a link to a file can be used for the playback. The file/link to the file can be provided as part of the resolution data.

If a key feature is processed and it is determined that resolution data corresponds to the key feature, the resolution data can be provided to the user assistance computer. Responsive to identifying a resolution and associating the resolution with the key features, resolutions can be associated with the key features for subsequent processing. For example, if a resolution is identified for a first key feature (e.g., an interface with a missing link to another webpage), the first key feature can be associated with the resolution in a key feature database or resolution database, and the resolution can be identified for a new session/request pair in which the webpage data includes the first key feature.

An assistance agent can highlight a key feature relating to an issue (e.g., the assistance agent explicitly identifying a portion of the webpage data as a key feature) and an associated resolution. Subsequent sessions can use the previously-highlighted key feature and the associated resolution. In some instances, a certainty level for a given resolution can be automatically calculated based on a measure of the similarity between the key feature of a resolved session (also referred to as resolved requests) and the key features of a new session being assisted. This can include comparing the key feature for a resolved session and key features of the new session and identifying a number of similarities between the key features. The similarities between the key features can be weighted to derive the certainty level.

IV. Webpage Error Resolution with User Interaction

Figure 4:
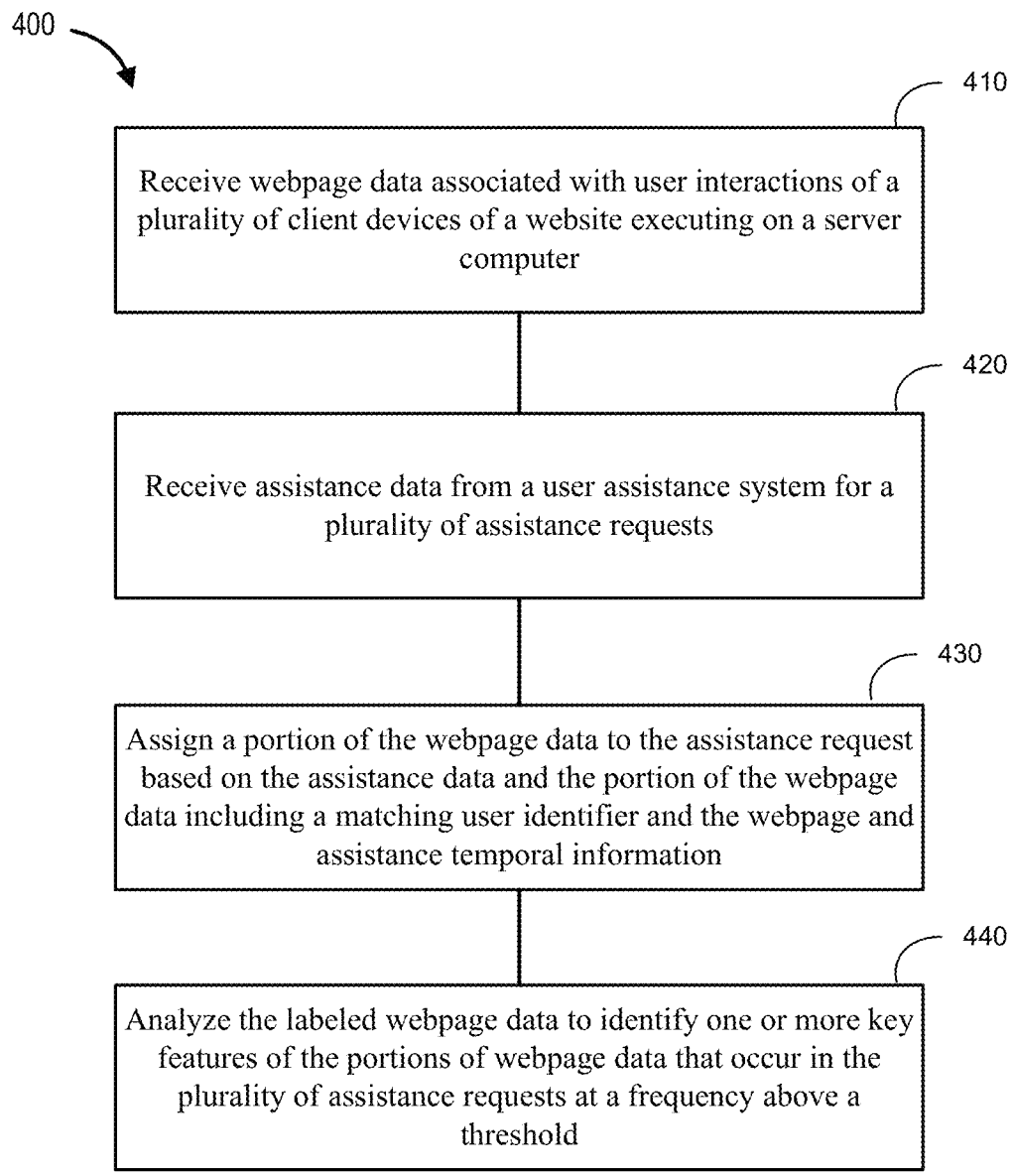
FIG. 4 illustrates a flowchart of a method of webpage error resolution with user interaction according to embodiments.

A user can utilize a client device (e.g., a desktop computer) to request a website from a server computer (e.g., a computer system). The user may perform actions on the webpage, for example, interacting with buttons, data elements, presented media, performing a process indicated on the website, etc. Webpage data may be collected by a detection system during the user's interactions with the website. In some cases, the user may encounter an error on the website. The user can utilize a user device (e.g., a smartphone) to contact a user assistance computer for assistance with the error. FIG. 4 describes this process as well as further steps in which the detection system can determine resolution(s) to the user's problem(s) with the webpage.

A. Generating Key Feature Database

As described above, user session data can be assigned to assistance data to identify key features in the user session data, e.g., that indicate a high likelihood of a problem or error that would result in a user assistance request. The key features can specify potential causes of receiving the assistance request. Once identified, the key features can be stored in a key feature database, which can also include resolution data (e.g., actions to resolve an error or problem).

FIG. 4 is a flow process 400 for assigning user session data to assistance data to identify key features in the user session data. The process as described herein can be performed by detection system 130 as described with respect to FIG. 1.

At block 410, a detection system can receive webpage data associated with user interactions of a plurality of client devices of a website executing on a server computer. As noted above, the webpage data can identify various user interactions with a website executing on a server computer. The user interactions for various users occur in respective user sessions with the website. The data for each session can form a session record, as described herein. One or more fields of a session record can include identifier(s) for matching (correlating) assistance data.

At block 420, the detection system can receive assistance data from a user assistance system for a plurality of assistance requests. As noted above, the assistance data can include data relating to a user communication with a user assistance computer. The assistance data can be received at various times, e.g., once an assistance sessions starts, ends, or in batches (e.g., at night). After the databases (e.g., key feature database) is developed, embodiments can receive assistance data in real-time once an assistance session starts.

At block 430, the detection system can assign a portion of the webpage data to the assistance request based on the assistance data and the portion of the webpage data including a matching user identifier and the webpage and assistance temporal information. This can be performed for each assistance request. Assigning the portion of the webpage data to the assistance request can generate labeled webpage data. The portions of webpage data assigned to the assistance request can include webpage temporal information that matches the assistance temporal information, which can be referred to as matching temporal information. As an example, the webpage temporal information (e.g., a start or end time of the web session) being within a specified amount of time of the assistance request. The detection system can label the webpage data based on the assistance data including matching user identifiers and then determine at least a pattern based on the labeled webpage data.

At block 440, the detection system can analyze the labeled webpage data to identify one or more key features of the portions of the webpage data that occur in the plurality of assistance requests at a frequency above a threshold, e.g., relative to web sessions not having assistance requests or within a frequency range between a minimum (not an outlier) and maximum (not a common feature, which would be unrelated to a website problem). For instance, if the feature (e.g., a type of event) occurs in about 60% of all web sessions and about in 60% in web sessions that result in an assistance request, then such a feature is likely not correlated with an assistance request and would not be a key feature. But if the feature occurs in 8% of web sessions that result in an assistance request but only in 2% of all web sessions (increase of 6%), then the feature can be identified as a key feature, e.g., where 6% is greater than the threshold, such as 2%, 3%, 4%, 5%, 6%, 10%, 15%, etc.

The key features can include events in web sessions with the website that have an increased likelihood of causing a user to make an assistance request. In some instances, in response to identifying key features that occur in the plurality of assistance requests at a frequency above a threshold, various actions can be taken, such as to provide identified resolution data. As noted above, the resolution data can include a course of action, which can resolve a problem, such as an error message encountered by the user. The resolution data can be associated with key features relating to a course of action. Accordingly, responsive to identifying the one or more key features as described herein, the one or more key features can be associated with the resolution data (e.g., in a key feature database). The assistance data can include resolution data associated with resolved requests of the plurality of assistance requests. The resolution data of a current request can be referred to as current resolution data, and the features of the session can be referred to as current features and current key features if stored in the key feature database.

The actions for the resolutions can be determined based on assistance data obtained from the user assistance system.

For example, during a first phase of operation, key feature(s) can be provided on an assistance computer during an assistance session. The agent can identify a resolution relating to the one or more key features (e.g., by selecting them), and such selections can be provided to the detection system along with the selected resolution. Such information can be provided can be communicated in various ways, e.g., using text or IDs corresponding to predetermined features and resolutions. The detection system can then determine that a particular resolution occurs in combination with a particular subset of one or more key features (e.g., at least a specified percentage of the assistance request having a key feature in the correlated webpage data also having a particular resolution that is assigned.

In some embodiments, data analytics module 306C, in conjunction with the processor, can output resolution data. In some embodiments, the resolution data can include a course of action, which can resolve a problem, such as an error message, encountered by the user. In other embodiments, the resolution data can comprise a summary (e.g., summary data). For example, the resolution data can comprise summary information derived from the one or more key features. The summary can include, for example, data that is relevant to the user assistance computer in providing assistance to the user of the user device. The summary can include one or more key features determined by detection system 306, or in some embodiments, one or more actions that may be performed by user assistance computer 304 and/or an operator thereof to solve the user's problem with the webpage. In various embodiments, the summary can be in any suitable format, for example, a sentence (e.g., created through a natural language processing method), a list of the key feature(s), etc. The summary data can be extracted from a session record that corresponding to the assistance data. A profile record can also be identified using the assistance data or data in the session record.

B. Identifying Resolutions

A key feature database can be used (e.g., queried) to identify whether webpage data of a session, which is correlated to an assistance request, is a key feature that occurs in association with a population of assistance requests at a frequency above a threshold. The key feature database can store key features in association with corresponding resolution data, so that resolution data can be identified when webpage data includes a key feature. The key feature database can store previous resolution data in association with key features from previous web sessions. Resolution data can be determined using the data stored in the key feature database.

Figure 5:
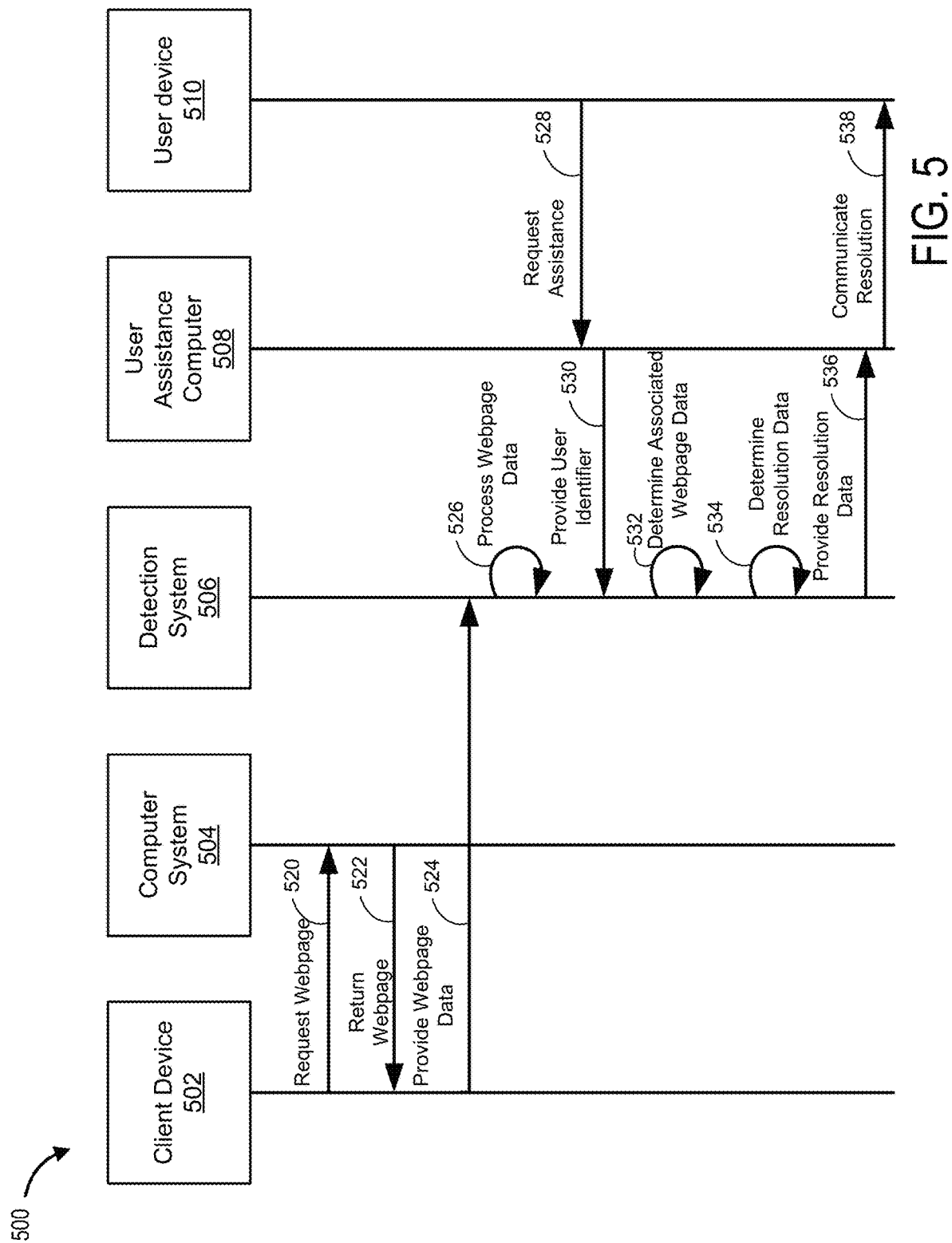
FIG. 5 is a flow process for assigning user session data to assistance data to identify key features in the user session data according to embodiments.

FIG. 5 illustrates a sequence diagram for webpage error resolution with user interaction according to embodiments. The embodiments illustrated in FIG. 5 will be described in the context of a user of user device 510 communicating with user assistance computer 508 via user device 510. For example, the user of user device 510 may initiate a phone call to user assistance computer 508. It is understood, however, that embodiments can be applied to other circumstances.

At step 520, the user of user device 510 may operate client device 502 to communicate with computer system 504. For example a web session may begin with the user on a web browser initiating a browser request for a document from computer system 504. The user may initiate the browser request on client device 502.

At step 522, once computer system 504 has received the request, the computer system 504 may transmit a response to client device's 508 web browser. The response of computer system 504 may include the web document requested by the user. The computer system 504 may further include within the response a Document Object Model (DOM), such as a hypertext markup language (HTML) DOM. The document may be rendered according to the DOM. In some embodiments, the web document may contain a reference to a detection agent (e.g., JavaScript code), which can then be fetched as a result from computer system 504. The detection agent can detect information about a website and/or operation of the website including the web document. The detection agent can monitor an interaction with a website via input to a client and can monitor operation of the website with respect to functions for displaying the website and/or communication with a host system hosting the website. Detection system 506, operating with the detection agent, can detect events related to operation of and/or interaction with a website to identify events that may cause to operation and/or performance of the website.

At step 524, client device 502 can provide webpage data to detection system 506. For example, client device 502 can provide data relating to interactions between the user of client device 502 and the webpage. In some embodiments, the detection agent (or a link to the agent) can be located within the webpage and may provide the webpage data from client device 502 to detection system 506 via computer system 504. In some embodiments, the webpage data can comprise an error message and a user identifier. The error message can correspond to an error that occurred during the user's interaction with the webpage.

At step 526, after receiving the webpage data, detection system 506 can process the webpage data. For example, in some embodiments, detection system 506 can extract events and other data and store these features in session records and user profile records as webpage data into a database. For at least some webpage date, the detection system 506 can process the webpage data to convert the webpage data to a different format, e.g., into statistical values about a session, such as a number of clocks on a button. The extraction of features can be from the webpage data directly obtained from a client device (e.g., a capture agent on the client device) or from session records that are generated based on the webpage data of a session.

At step 528, the user of user device 510 can initiate a phone call (or other suitable communication) with user assistance computer 508 regarding any suitable matter, for example, an error with a website provided by computer system 504 to client device 502. The phone call can be received, for example, by a communication component (e.g., a phone, a text chat, etc.) of user assistance computer 508. The user device 510 can request assistance for the error from user assistance computer 508. For example, the user of user device 510 can tell the operator of user assistance computer 508 that an error occurred on the webpage. The user device 510 and/or user can provide a user identifier to user assistance computer 508. For example, the user identifier can include a phone number, a username, an email address, and/or any other suitable identifier capable of uniquely identifying the user.

In some embodiments, step 528 may occur at any suitable point in time. For example, client device 502 can provide webpage data to detection system 506 as webpage data is created. Alternatively, webpage data may be batched by client device 502 over any suitable period of time and then provided to detection system 506. In some embodiments, the information regarding events can include a user identifier. The user identifier can identify the user involved in the event. For example, the user identifier can include a phone number, a username, an email address, and/or any other suitable identifier capable of uniquely identifying the user.

At step 530, after receiving the user identifier from user device 510, user assistance computer 508 can provide at least the user identifier (or other assistance data) to detection system 506. Thus, current assistance data can be received for the current assistance request. For example, user assistance computer 508 can generate a resolution request message comprising the user identifier. The resolution request message may request a resolution to the error that the user is experiencing.

At step 532, after receiving at least the user identifier from user assistance computer 508, detection system 506 can identify the user associated with the user identifier. For example, detection system 506 can determine webpage data being associated with the user identifier by querying webpage data database 312. The detection system 506 can determine whether or not webpage data (e.g., received at step 524) is associated to the user identifier, at least for any recent session data. Such session data can be kept for a specified amount of time (e.g., 1, 2, 6, 12, or 24 hours), as users would be expected to contact the user assistance system within a certain amount of time after the problem was encountered. For example, an event, such as an error message, may have previously occurred while the user was signed-in to an account and/or profile on the webpage.

At step 534, after determining that the webpage data includes a user identifier that matches the user identifier received from user assistance computer 508, detection system 506 can perform any suitable process that may output resolution data. For example, detection system 506 can utilize previously determined patterns and/or models (e.g., determined in FIG. 3) to determine resolution data. Further details for determining resolution data is described with respect to section III (C) above. For example, the detection system can use the extracted features to query the key feature database to identify one or more key features (e.g., an extracted feature existing in the key feature database).

The resolution data can be identified using key features extracted by webpage data, which is described in greater detail with respect to FIG. 8 below. The resolution data can include a course of action which can resolve a problem, such as an error message, encountered by the user. For example, after determining a model using webpage data and assistance data, detection system 506 can input the webpage data into the model to determine resolution data, the resolution data comprising an action that can be taken to solve an error included in the webpage data. For example, the action can to prompt the user to reset their password, prompt the user to setup two factor authentication, ask the user to provide additional information, prompt the user to sign-out then sign-in again to the user's account, and/or any other suitable action. Determining the resolution data can include determining that at least a threshold amount of key features are stored in the key feature database in association with the resolution data. For example, a threshold percentage (e.g., at least 30%, 40%, 50%, or 60%) of a set of keys features associated with the resolution data can be required to be in the webpage data of a session corresponding to an assistance request. In some embodiments, the resolution data can comprise one or more than one actions, where each action can correspond to a determined certainly level. The certainty level can be a percentage that indicates a likelihood of the action resolving the error(s).

Instead of a course of action or in addition, the resolution data can include summary data, e.g., the key feature(s). Such key features can be identified from events that occurred in a session within a time window of receipt of an assistance request. As another example, the key features can be identified from events that occurred at an anomalous rate (e.g., during a time period, such as the time window in the previous example) that deviates from an expected amount based on historical web sessions. As yet another example, the key features can be identified from events that are correlated with web sessions that do not reach a target stage of the website. As yet another example, the key features can be identified as occurring in web sessions corresponding to assistance requests at a frequency above a threshold relative, e.g., relative to web sessions not having assistance requests or within a frequency range between a minimum (not an outlier) and maximum (not a common feature, which would be unrelated to a website problem).

In some embodiments, the key features can be associated with the resolution data with respective weights. Determining the threshold amount as described herein can be determined as a weighted average for each of the multiple key features that are associated with the resolution data. Key features that occur more often with assistance requests that have been identified as corresponding to an error and have a resolved actions (e.g., via a user assistance computer that identifies a resolved request) can be weighted higher. The association of key features with resolution data can be updated based on subsequent assistant data. Such updating can include reducing a number of key features that are associated with the resolution data.

At step 536, detection system 506 can provide the resolution data to user assistance computer 508. In some embodiments, detection system 506 can also provide the user identifier along with the resolution data.

At step 538, after receiving the resolution data, user assistance computer 508 can communicate a resolution to the error based on the resolution data. For example, the resolution data can comprise an action of resetting the user's password. User assistance computer 508 can prompt the user of user device 510 to reset their password.

V. Real-Time Resolution Deployment

Some embodiments can implement a real-time resolution deployment based on resolution data determined by a detection system. The detection system can be configured to monitor and receive webpage data from a plurality of client devices. The detection system can utilize previously determined key features of webpage data that are indicative in a user contacting a user assistance computer to determine resolution data. The resolution data may be provide to a computer system, which hosts the webpage, so that the computer system can implement an action to resolve an problem with the webpage based on the resolution data. Such a real-time resolution can be performed proactively before a user assistance system is inundated with too many assistance requests.

A. Sequence Diagram for Resolution Deployment

Figure 6:
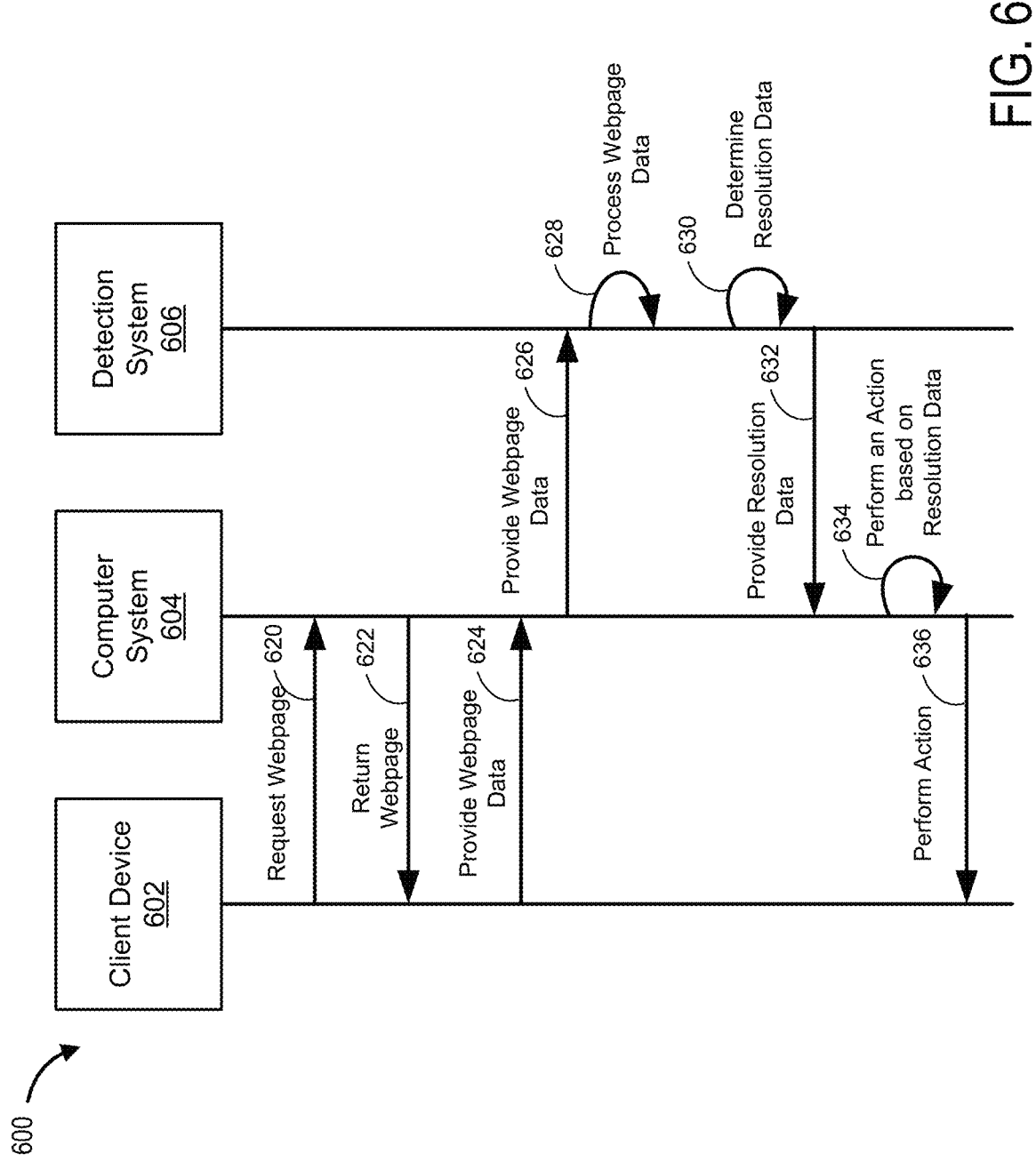
FIG. 6 illustrates a flowchart of an alternative webpage error resolution method according to embodiments.

FIG. 6 illustrates a flowchart of an alternative webpage error resolution method according to embodiments. The method illustrated in FIG. 6 will be described in the context of a user operating a client device 602, where the client device 602 requests a webpage from a computer system 604. The client device 602 may encounter a problem with the webpage (e.g., login not working, a button that is unresponsive, a video (or other media) not loading, a broken web link, etc.). It is understood, however, that the disclosure can be applied to other circumstances.

Prior to step 620, detection system 606 can receive webpage data over time from one or more computer systems and/or client devices, for example, as illustrated in FIG. 3.

For example, detection system 606 can receive data relating to user interactions with a webpage. Detection system 606 can perform any suitable data processing to determine patterns, models, etc. based on the received webpage data.

At step 620, client device 602 can transmit a request message to computer system 604. The request message can include a request for an electronic document (e.g., a webpage) accessed from a URL at client device 602. At step 622, after receiving the request message from client device 602, computer system 604 can provide the webpage to client device 602.

At step 624, during the user's interactions with the webpage, client device 602 can provide webpage data to computer system 604. For example, the webpage data can comprise an error message and the user's actions on the webpage.

At step 626, after receiving the webpage data from client device 602, computer system 604 can provide the webpage data to detection system 606. In some embodiments, client device 602 can provide webpage data directly to detection system 606.

At step 628, after receiving the webpage data, detection system 606 can process the webpage data. Detection system 606 can pre-process the webpage data. For example, detection system 606 can convert the webpage data into a format for input into a machine learning model.

At step 630, detection system 606 can then determine resolution data based on the webpage data. For example, detection system 606 can input the webpage data into a machine learning model that outputs resolution data. The machine learning model may have previously been trained using webpage data and assistance data, as described herein. The machine learning model can determine, for example, that the webpage data received from computer system 604 includes a particular error that is indicative of user's preceding to contact a user assistance computer. The detection system 606 can utilize the resolution data such that the user may not need to contact the user assistance computer.

In some embodiments, the resolution data can comprise actions that may be performed to resolve the errors, as well as comprise certainty values for each action. Detection system 606 can determine whether or not a particular action is associated with a certainty value that exceeds a predetermined threshold. For example, detection system 606 can determine whether or not an action of initiating a chat bot that presents a notification to the user that corresponds to a certainty value of 26% exceeds a predetermined threshold of, for example, 90%. In this example, detection system 606 can determine that the certainty value does not exceed the predetermined threshold, and thus the action may not be immediately implemented. The resolution data, however, may also comprise a second action of highlighting a particular element on the webpage (e.g., a button) corresponding to a certainty value of 96%. Detection system 606 can determine that the action can be implemented.

At step 632, after determining the resolution data and, in some embodiments, if a corresponding certainty value exceeds the predetermined threshold, detection system 606 can provide the resolution data to computer system 604.

At step 634, after receiving the resolution data from detection system 606, computer system 604 can perform the action indicated in the resolution data. For example, the computer system 604 can indicate to client device 602 to perform the action of the resolution data. At step 636, computer system 604 can perform the action on the webpage provided to client device 602. For example, the resolution data can include an action of 1) highlighting a particular element on the webpage (e.g., a button), 2) presenting a survey to the user, 3) initiating a chat bot that presents a notification to the user, 4) redirecting the webpage to a second webpage, and/or any other suitable action. In some embodiments, the resolution data may be provided directly to client device 602 from detection system 606.

B. Determining Resolution Data Based on Extracted Features in Webpage Data

Figure 7:
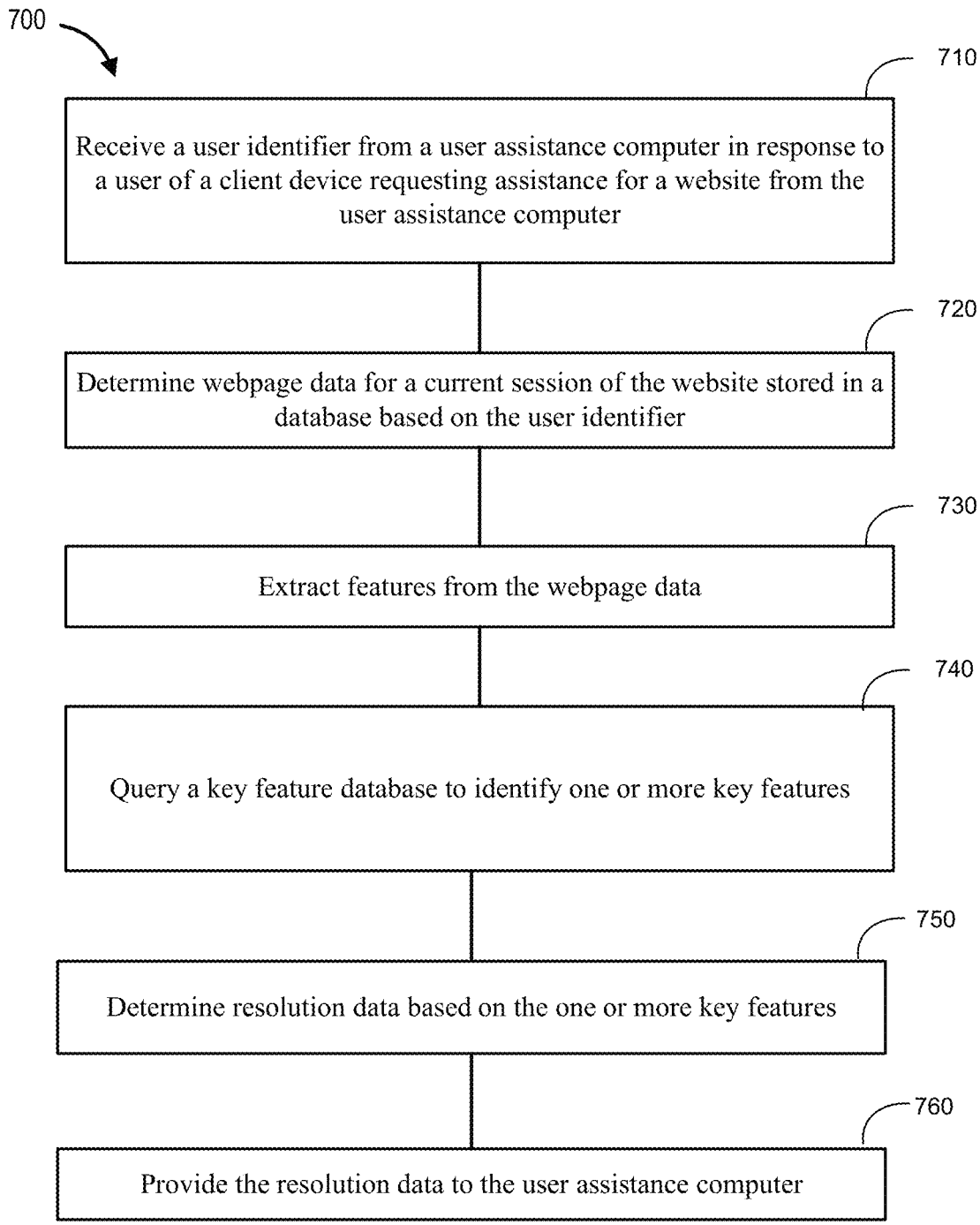
FIG. 7 is a flow process for determining resolution data based on extracted features included in webpage data.

As noted above, features can be extracted from webpage data relating to a user interaction with a webpage. The extracted features can be processed to identify resolution data that can assist in identifying a resolution to an error or cause of frustration on a webpage. FIG. 7 is a flow process 700 for determining resolution data based on extracted features included in webpage data.

At block 710, the detection system can receive a user identifier from a user assistance computer in response to a user of a client device requesting assistance for a website from the user assistance computer. Once a user assistance request is received and an identifier is obtained, an API call can be made to the detection system from the user assistance system.

At block 720, the detection system can determine webpage data for a current session of the website stored in a database based on the user identifier. This can include retrieving the webpage data associated with the user identifier from a webpage data database 312 as described with respect to FIG. 3. For example, the user identifier can be used to identify a particular session of that user that has recently occurred. For example, a session record can include the user identifier, as was captured during a web session. Any data described herein can be anonymized using hashes so that the actual data is not known, but matches can be determined.

At block 730, the detection system can extract features from the webpage data of the identified session record and/or profile record. The extracted features can relate to user interactions, webpages, etc., from the webpage data and can be a cause or correlate with the receipt of the request for assistance for a website from a user of the client device. In some instances, the extracted features can include engagements (clicks, typing, scrolling), webpage visits, technical indicators identifying a webpage journey flow and specifying potential friction in the webpages. Further details about which features are extracted (e.g., filtered out or kept) are described in the next section.

In some embodiments, extracting the features from the webpage data comprises filtering the webpage data to exclude events that occur in at least a specified percentage of web sessions and to include events that indicate a problem with the website.

At block 740, the detection system can query a key feature database using the extracted features to identify one or more key features. In some implementations, the one or more key features can be those that occur in association with a population of assistance requests at a frequency above a threshold, e.g., relative to web sessions not having assistance requests. The threshold can specify a minimum frequency (e.g., represented in a percentage or number) for each key feature that corresponds with the population of assistance requests. In some embodiments, the detection system can identify key features that that occur in association with a population of assistance requests at a frequency that is both above a minimum threshold and below a maximum threshold, e.g., as described herein. Thus, the key feature database can include key features that correlate with assistance requests (e.g., as described herein) and might have corresponding resolutions. Therefore, the identified key features (i.e. in the webpage data of the correlated session) can be used to identify corresponding resolution data, which is stored in a record for a key feature.

As another example, the key features can be identified from events that occurred at an anomalous rate (e.g., during a time period, such as the time window in the previous example) that deviates from an expected amount based on historical web sessions. As yet another example, the key features can be identified from events that are correlated with web sessions that do not reach a target stage of the website.

At block 750, the detection system can determine resolution data based on the one or more key features. The resolution data can be determined in combination with the query to a key feature database (e.g., when a match is obtained using the webpage data) or a separate table can be searched using the one or more key features. In some implementations, a particular set of key features may be used to query a resolution table that has a resolution corresponding to that set of key features. In this manner, a resolution can be determined for an occurrence of multiple key features together in web session. The resolution data can include information specifying a course of action based on processing the webpage data.

In some instances, the resolution data comprises at least one action and a certainty level. In such instances, the detection system can determine whether or not the certainty level exceeds a predetermined threshold. For example, responsive to identifying a resolution for a session (assistance session and/or web session), each the one or more key features for that session can be assigned a point value (e.g., where each key feature is assigned a common point value and where all point value equal a common value (e.g., 100)). For a new session, the webpage data of that session can be identified in a key feature database (e.g., by determining whether an extracted feature exists in the key feature database, thereby identifying one or more key features. For each matching key feature, the database can include fields specifying one or more resolutions, which may be stored in a resolution database. Each resolution can have a corresponding set of key features, and the matching number of key features for a given resolution can provide a certainly (confidence) level for a given resolution. Accordingly, for every key feature in a new session that matches a key feature from a previously-resolved session, the original point value assigned to the key feature in the previously-resolved session can be added to the certainty level. As an example, if a resolution of a resolved session includes ten key features and five key features of the current session match, the certainty level can be determined as 50%.

As more sessions are resolved with a specific resolution, the key features associated with a resolution can decrease. For example, a new session can be assigned the same resolution, and overlapping key features in the newly-resolved session can be carried forward as the set of features corresponding to that resolution. In this manner, how the scoring is performed can be updated. Accordingly, when a new session is correlated to a resolution, the key features matching key features of a previously-resolved session can form the basis of a certainty score calculation for future sessions for the resolution. This can narrow down the cause of the problem to fewer key features and can increase the certainty score if the session includes a key feature matching key features of previously-resolved session(s).

At block 760, the detection system can provide the resolution data to the user assistance computer. In some instances, the detection system can provide the resolution data to the server computer when the certainty level exceeds the predetermined threshold.

VI. Key Feature Identification

As described herein, one or more key features can be identified from obtained webpage data. For example, labeled webpage data can be analyzed to identify one or more key features that occur in a plurality of assistance requests at a frequency above a threshold. As another example, the webpage data can be processed to extract features and the extracted features can be queried using a key feature database to identify the one or more key features.

Figure 8:
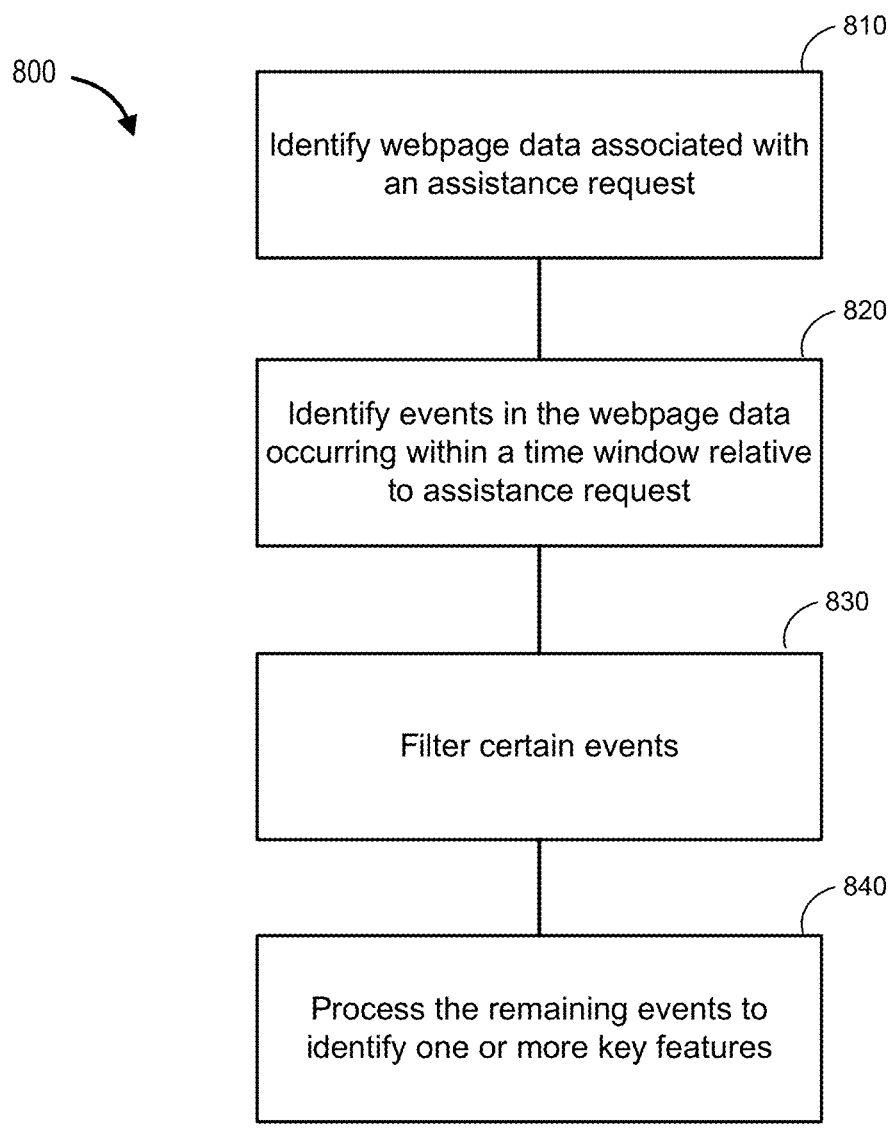
FIG. 8 is a flow diagram for identifying one or more key features according to embodiments.

FIG. 8 is a flow diagram for identifying one or more key features according to embodiments. As noted above, the key features can include parameters of website states that likely cause users to make assistance requests. The key features can relate to specific events relating to a user interaction with the webpage during a session.

At block 810, the detection system can identify webpage data associated with an assistance request. The webpage data can be retrieved from a webpage data database using information obtained from a user assistance request received at a user assistance computer 204.

The particular webpage data (e.g., in a session record or a user record) can be identified by matching one or two common identifiers, e.g., as described above. The webpage data can include a plurality of events relating to a user interaction on a webpage. The events can include corresponding timestamps indicating a time of performance of each event.

In an example, the webpage data can specify that the user failed to reach a target page, but rather, ended a session on the webpage prior to reaching the target page. In this example, a portion of the webpage can include an error that lowered user experience when interacting with the webpage. For instance, the error can include an interface (e.g., button) on a webpage that fails to redirect the user to another webpage or a portion of a webpage that fails to load during the session. The errors can result in lower user experience (e.g., frustration by the user in interacting with the webpage, a lower conversion on the webpage).

At block 820, the detection system can identify events in the webpage data occurring within a time window. The time window can specify a time period prior to receipt of the assistance request, e.g., 5, 10, or 30 minutes before. The events occurring within the time window can include events preceding a request for assistance for a session. This can include identifying a number of events occurring prior to obtaining the request for assistance from the user. For example, a user may experience an error on an interface on a webpage, indicated by a number of clicks on the interface, and then select an assistance interface (e.g., a help button, contact administrator button) on the webpage. In this example, the webpage data can identify the events relating to the user interacting with the interface with the error and the webpage including the interface with the error.

As another example, the webpage data can be processed to identify events relating to a last webpage interacted with by a user prior to termination of a session and subsequent receipt of an assistance request. Identifying events relating to the last webpage interacted with by the user can increase efficiency in identifying an error or point of frustration on a webpage to assist in identifying the key features and/or providing resolution data.

In some instances, the webpage data can be processed to filter out events that did not occur historically in a specified number (e.g., a majority) of other sessions. These events may not occur frequently enough to be a cause of an error, and thus, may not comprise a key feature as described herein. These events can be filtered out so as to not identify the events for further processing. Filtering various events can increase processing efficiency in identifying the one or more key features.

For example, events can be identified from the webpage data that is associated with each user identifier at a time during a web session. A subset of the events can be identified that occurred within a time window of receipt of each assistance request. The subset of events can be analyzed to identify the one or more key features (e.g., as discussed at block 440 in FIG. 4).

At block 830, the detection system can filter (to include or exclude) certain events. As an example, the detection system can dynamically determine events that occurring at an anomalous rate during all or a portion of the time window used in block 820. Events occurring at an anomalous rate can include events deviating from an expected number during user interaction with a webpage. As an example, if the webpage data specifies that the user clicked on an interface more than an average amount of clicks on a single interface (e.g., ten clicks on a single interface without moving from that webpage), these events can be highlighted as an event occurring at an anomalous rate. As another example, events correlated with web sessions that do not reach a target stage of the website can be identified.

In some embodiments, events with an increased or decreased likelihood (e.g., relative to an average for a population of sessions) of being in a web session that results in converting (e.g., reaching a target stage/page) can be identified. This can include comparing events in the webpage data with historical events comprising an increased/decreased likelihood of reaching a target webpage. Events correlated an increased likelihood of conversion can be filtered out, as they are unlikely to be the cause of any problems. Events correlated a reduced likelihood of conversion can be filtered out, as they are more likely to be the cause of any problems. Identifying such events can include performing a feature importance processing technique. The feature importance can identify events whose inclusion in a web session can discriminate between sessions that result a conversion and sessions that do not result in a conversion.

For a feature importance process, a score can be determined using a machine learning model for how well a particular event predicts whether a session will reach a target stage. The score for an event can be determined based on an accuracy of the model (including the event an input) to predict whether a session reaches a target stage (e.g., a checkout button, opening an account, completing a questionnaire, etc.). The machine learning model is trained using the set of sessions that result in a conversion and those that do not. The feature importance score can be compared to a threshold to determine whether there is sufficient correlation. As examples, the threshold can be a ranking relative to other attribute values or an absolute score, e.g., how much the accuracy changes when the attribute is included or is not included as an input to the model.

As another example, events can be identified from the webpage data that is associated with each user identifier at a time during a web session. A subset of the events can be identified that occur at an anomalous rate that deviates from an expected amount based on historical web sessions. The subset of events can be analyzed to identify the one or more key features (e.g., as discussed at block 440 in FIG. 4).

In some instances, events corresponding with lower user experience while interacting with a webpage can be filtered out. For instance, events that include a load time or an interaction time by the user longer than an average time duration can be identified. As another example, events with improperly loaded webpages, images, videos, etc., on a webpage due to a failed network call can be identified.

In another example, events that prevented the user from reaching a target page during a session can be identified. The target page can include a webpage relating to a successful interaction with a user (e.g., a webpage confirming a subscription or conversion by the client). The webpage data can be processed to identify any events that prevented the user from reaching the target page. Webpage data from previous sessions with other clients can be used to identify common events that prevented reaching the target page. For example, if a number of previous sessions include a common event relating to selection of a button on a webpage that did not lead to reaching the target page, an event in a series of events including selection of the same button can be identified as possible key feature.

At block 840, the detection system can process remaining events to identify one or more key features. The identified events can include events identified or events removed as described with respect to steps 620 and/or 630. For example, the identified events can be analyzed to identify one or more key features that occur in a plurality of assistance requests at a frequency above a threshold. This can include comparing each identified event against a number of previously-identified events to identify events that relate to a number of assistance requests provided by client devices. For instance, if a number of assistance requests relate to an interface on a webpage, identified events relating to the interface can be identified as a key feature.

As another example, the remaining events can be processed to identify the key features from the identified events. The key features can relate to mouse movements, actions taken on a webpage, the portion of a webpage displayed, etc. Key features can be included in a key feature database. The key feature database can include entries relating to features that occur in association with a population of assistance requests at a frequency above a threshold. The key feature database can be periodically updated to identify other features identified in association with assistance requests at the frequency above the threshold. Resolution data can be determined based on the one or more key features.

VII. General Computer Systems

Figure 9:
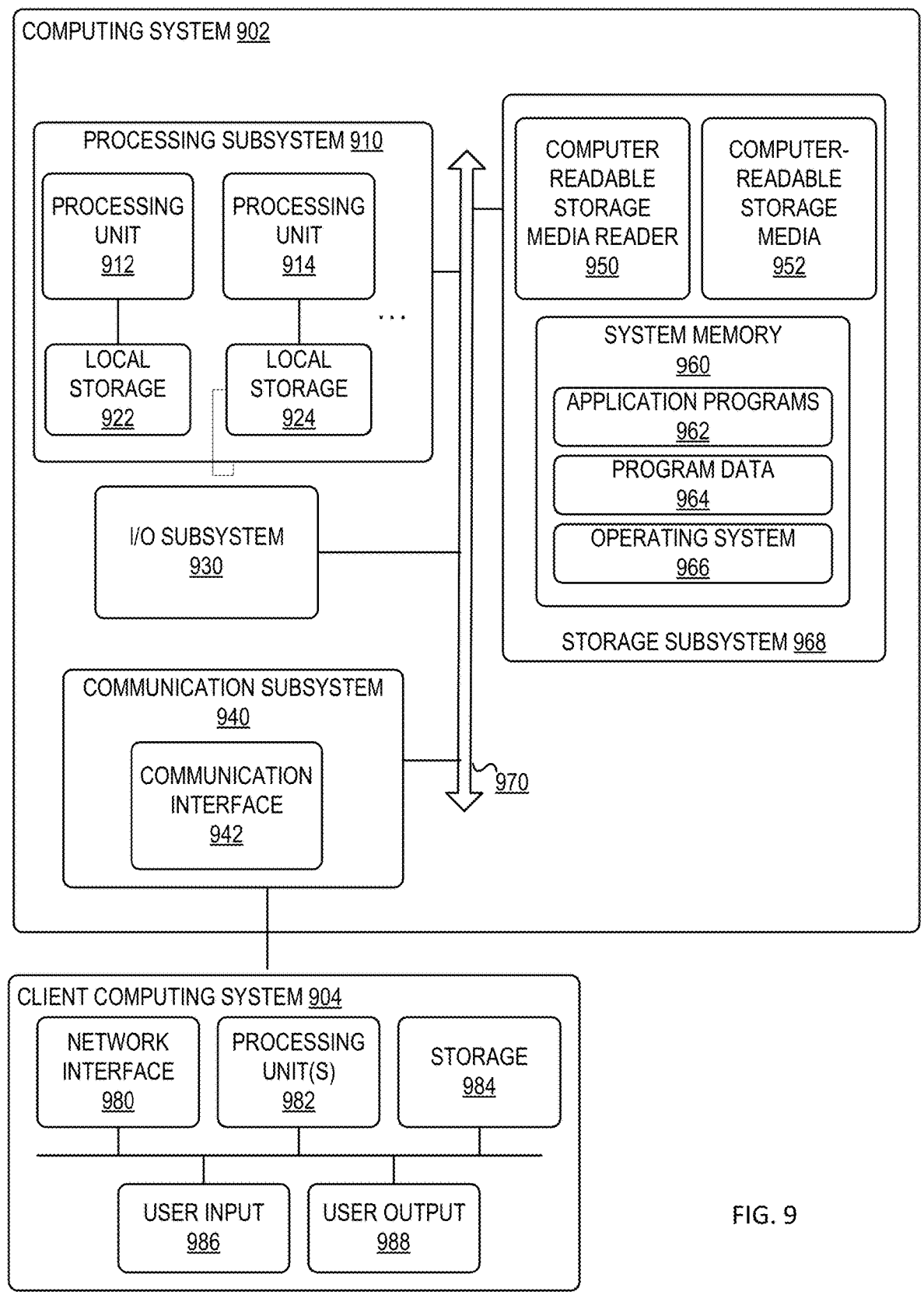
FIG. 9 illustrates a block diagram of an example computer system for implementing some embodiments.

Various operations described herein may be implemented on computer systems, which may be of generally conventional design. FIG. 9 shows a simplified block diagram of a representative computing system 902 and client computing system 904 usable to implement certain embodiments of the present disclosure. In various embodiments, computing system 902 or similar systems may implement capture management system, or any other computing system described herein or portions thereof.

Computing system 902 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 902 may include processing subsystem 910. Processing subsystem 910 may communicate with a number of peripheral systems via bus subsystem 990. These peripheral systems may include I/O subsystem 930, storage subsystem 968, and communication subsystem 940.

Bus subsystem 990 provides a mechanism for letting the various components and subsystems of computing system 902 communicate with each other as intended. Although bus subsystem 990 is shown schematically as a single bus, alternative embodiments of the bus subsystem may utilize multiple buses. Bus subsystem 990 may form a local area network that supports communication in processing subsystem 910 and other components of server computing system 920. Bus subsystem 990 may be implemented using various technologies including server racks, hubs, routers, etc. Bus subsystem 990 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 930 may include devices and mechanisms for inputting information to computing system 902 and/or for outputting information from or via computing system 902. In general, use of the term "input device" is intended to include all possible types of devices and mechanisms for inputting information to computing system 902. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 902 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 910 controls the operation of computing system 902 and may comprise one or more processing units 912, 914, etc. A processing unit may include one or more processors, including single core processor or multicore processors, one or more cores of processors, or combinations thereof. In some embodiments, processing subsystem 910 may include one or more special purpose co-processors such as graphics processors, digital signal processors (DSPs), or the like. In some embodiments, some or all of the processing units of processing subsystem 910 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 922, 924. Any type of processors in any combination may be included in processing unit(s) 912, 914.

In some embodiments, processing subsystem 910 may be implemented in a modular design that incorporates any number of modules (e.g., blades in a blade server implementation). Each module may include processing unit(s) and local storage. For example, processing subsystem 910 may include processing unit 912 and corresponding local storage 922, and processing unit 914 and corresponding local storage 924.

Local storage 922, 924 may include volatile storage media (e.g., conventional DRAM, SRAM, SDRAM, or the like) and/or non-volatile storage media (e.g., magnetic or optical disk, flash memory, or the like). Storage media incorporated in local storage 922, 924 may be fixed, removable or upgradeable as desired. Local storage 922, 924 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 912, 914 need at runtime. The ROM may store static data and instructions that are needed by processing unit(s) 912, 914. The permanent storage device may be a non-volatile read-and-write memory device that may store instructions and data even when a module including one or more processing units 912, 914 and local storage 922, 924 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 922, 924 may store one or more software programs to be executed by processing unit(s) 912, 914, such as an operating system and/or programs implementing various server functions such as functions of capture management system, or any other server(s) associated with capture management system. "Software" refers generally to sequences of instructions that, when executed by processing unit(s) 912, 914 cause computing system 902 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 912, 914. In some embodiments the instructions may be stored by storage subsystem 968 (e.g., computer readable storage media). In various embodiments, the processing units may execute a variety of programs or code instructions and may maintain multiple concurrently executing programs or processes. At any given time, some or all of the program code to be executed may be resident in local storage 922, 924 and/or in storage subsystem including potentially on one or more storage devices. Software may be implemented as a single program or a collection of separate programs or program modules that interact as desired. From local storage 922, 924 (or non-local storage described below), processing unit(s) 912, 914 may retrieve program instructions to execute and data to process in order to execute various operations described above.

Storage subsystem 968 provides a repository or data store for storing information that is used by computing system 902. Storage subsystem 968 provides a tangible non-transitory computer-readable storage medium for storing the basic programming and data constructs that provide the functionality of some embodiments. Software (programs, code modules, instructions) that when executed by processing subsystem 910 provide the functionality described above may be stored in storage subsystem 968. The software may be executed by one or more processing units of processing subsystem 910. Storage subsystem 968 may also provide a repository for storing data used in accordance with the present disclosure.

Storage subsystem 968 may include one or more non-transitory memory devices, including volatile and non-volatile memory devices. As shown in FIG. 9, storage subsystem 968 includes a system memory 960 and a computer-readable storage media 952. System memory 960 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 902, such as during start-up, may typically be stored in the ROM. The RAM typically contains data and/or program modules that are presently being operated and executed by processing subsystem 910. In some implementations, system memory 960 may include multiple different types of memory, such as static random access memory (SRAM) or dynamic random access memory (DRAM). Storage subsystem 968 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 968.

By way of example, and not limitation, as depicted in FIG. 9, system memory 960 may store application programs 962, which may include client applications, Web browsers, mid-tier applications, relational database management systems (RDBMS), etc., program data 964, and one or more operating systems 966. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 952 may store programming and data constructs that provide the functionality of some embodiments. Software (programs, code modules, instructions) that when executed by processing subsystem 910 a processor provide the functionality described above may be stored in storage subsystem 968. By way of example, computer-readable storage media 952 may include non-volatile memory such as a hard disk drive, a magnetic disk drive, an optical disk drive such as a CD ROM, DVD, a Blu-Ray® disk, or other optical media. Computer-readable storage media 952 may include, but is not limited to, Zip® drives, flash memory cards, universal serial bus (USB) flash drives, secure digital (SD) cards, DVD disks, digital video tape, and the like. Computer-readable storage media 952 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable storage media 952 may provide storage of computer-readable instructions, data structures, program modules, and other data for computing system 902.

In certain embodiments, storage subsystem 968 may also include a computer-readable storage media reader 950 that may further be connected to computer-readable storage media 952. Together and, optionally, in combination with system memory 960, computer-readable storage media 952 may comprehensively represent remote, local, fixed, and/or removable storage devices plus storage media for storing computer-readable information.

In certain embodiments, computing system 902 may provide support for executing one or more virtual machines. Computing system 902 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 902. Accordingly, multiple operating systems may potentially be run concurrently by computing system 902. Each virtual machine generally runs independently of the other virtual machines.

Communication subsystem 940 provides an interface to other computer systems and networks. Communication subsystem 940 serves as an interface for receiving data from and transmitting data to other systems from computing system 902. For example, communication subsystem 940 may enable computing system 902 to establish a communication channel to one or more client computing devices via the Internet for receiving and sending information from and to the client computing devices.

Communication subsystem 940 may support both wired and/or wireless communication protocols. For example, in certain embodiments, communication subsystem 940 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 902.11 family standards, or other mobile communication technologies, or any combination thereof), global positioning system (GPS) receiver components, and/or other components. In some embodiments, communication subsystem 940 may provide wired network connectivity (e.g., Ethernet) in addition to or instead of a wireless interface.

Communication subsystem 940 may receive and transmit data in various forms. For example, in some embodiments, communication subsystem 940 may receive input communication in the form of structured and/or unstructured data feeds, event streams, event updates, and the like. For example, communication subsystem 940 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 940 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 940 may also be configured to output the structured and/or unstructured data feeds, event streams, event updates, and the like to one or more databases that may be in communication with one or more streaming data source computers coupled to computing system 902.

Communication subsystem 940 may provide a communication interface 942, e.g., a WAN interface, which may provide data communication capability between the local area network (bus subsystem 990) and a larger network, such as the Internet. Conventional or other communications technologies may be used, including wired (e.g., Ethernet, IEEE 902.3 standards) and/or wireless technologies (e.g., Wi-Fi, IEEE 902.11 standards).

Computing system 902 may operate in response to requests received via communication interface 942. Further, in some embodiments, communication interface 942 may connect computing systems 902 to each other, providing scalable systems capable of managing high volumes of activity. Conventional or other techniques for managing server systems and server farms (collections of server systems that cooperate) may be used, including dynamic resource allocation and reallocation.

Computing system 902 may interact with various user-owned or user-operated devices via a wide-area network such as the Internet. An example of a user-operated device is shown in FIG. 9 as client computing system 904. Client computing system 904 may be implemented, for example, as a consumer device such as a smart phone, other mobile phone, tablet computer, wearable computing device (e.g., smart watch, eyeglasses), desktop computer, laptop computer, and so on.

For example, client computing system 904 may communicate with computing system 902 via communication interface 942. Client computing system 904 may include conventional computer components such as processing unit(s) 982, storage device 984, network interface 980, user input device 986, and user output device 988. Client computing system 904 may be a computing device implemented in a variety of form factors, such as a desktop computer, laptop computer, tablet computer, smart phone, other mobile computing device, wearable computing device, or the like.

Processing unit(s) 982 and storage device 984 may be similar to processing unit(s) 912, 914 and local storage 922, 924 described above. Suitable devices may be selected based on the demands to be placed on client computing system 904; for example, client computing system 904 may be implemented as a "thin" client with limited processing capability or as a high-powered computing device. Client computing system 904 may be provisioned with program code executable by processing unit(s) 982 to enable various interactions with computing system 902 of a message management service such as accessing messages, performing actions on messages, and other interactions described above. Some client computing systems 904 may also interact with a messaging service independently of the message management service.

Network interface 980 may provide a connection to a wide area network (e.g., the Internet) to which communication interface 942 of computing system 902 is also connected. In various embodiments, network interface 980 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 986 may include any device (or devices) via which a user may provide signals to client computing system; client computing system may interpret the signals as indicative of particular user requests or information. In various embodiments, user input device 986 may include any or all of a keyboard, touch pad, touch screen, mouse or other pointing device, scroll wheel, click wheel, dial, button, switch, keypad, microphone, and so on.

User output device 988 may include any device via which client computing system may provide information to a user. For example, user output device 988 may include a display to display images generated by or delivered to client computing system 904. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 988 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 912, 914 and 982 may provide various functionality for computing system 902 and client computing system, including any of the functionality described herein as being performed by a server or client, or other functionality associated with message management services.

It will be appreciated that computing system 902 and client computing system 904 are illustrative and that variations and modifications are possible. Computer systems used in connection with embodiments of the present disclosure may have other capabilities not specifically described here. Further, while computing system 902 and client computing system 904 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present disclosure may be realized in a variety of apparatus including electronic devices implemented using any combination of circuitry and software.

While this disclosure has been described with respect to specific embodiments, one skilled in the art will recognize that numerous modifications are possible. Embodiments of this disclosure may be realized using a variety of computer systems and communication technologies including but not limited to specific examples described herein.

In the detailed description of exemplary embodiments of this disclosure, reference is made to the accompanying drawings which form a part hereof, and in which is shown by way of illustration specific exemplary embodiments in which this disclosure may be practiced. These embodiments are described in sufficient detail to enable those skilled in the art to practice this disclosure, and it is to be understood that other embodiments may be utilized and that logical, mechanical, electrical and other changes may be made without departing from the scope of the present disclosure.

Embodiments of the present disclosure may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

It is apparent for those skilled in the art that, for the particular operation processes of the units described above, reference may be made to the corresponding steps/components in the related method/system embodiment sharing the same concept and the reference is regarded as the disclosure of the related units too. And therefore some of the particular operation processed will not be described repeatedly or in detail for concision of the description.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional, functional, and/or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer apparatus may include a monitor, printer, or other suitable display for providing any of the results mentioned herein to a user.

Any of the methods disclosed herein may be totally or partially performed with a computer system including one or more processors, which can be configured to perform the steps. Thus, embodiments can be directed to computer systems configured to perform the steps of any of the methods disclosed herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The features and advantages described in the detailed description are not all inclusive and, in particular, many additional features and advantages will be apparent to one of ordinary skill in the art in view of the drawings, detailed description, and claims. Moreover, it should be noted that the language used in the detailed description has been principally selected for readability and instructional purposes, and may not have been selected to delineate or circumscribe the inventive subject matter.

Note that in this description, references to "one embodiment," "an embodiment" or "some embodiments" mean that the feature being referred to is included in at least one embodiment of this disclosure. Further, separate references to "one embodiment" or "some embodiments" in this description do not necessarily refer to the same embodiment(s); however, neither are such embodiments mutually exclusive, unless so stated and except as will be readily apparent to those skilled in the art. Thus, this disclosure can include any variety of combinations and/or integrations of the embodiments disclosed herein. However, other embodiments of this disclosure may be directed to specific embodiments relating to each individual aspect, or specific combinations of these individual aspects. Thus, although this disclosure has been described with respect to specific embodiments, it will be appreciated that this disclosure is intended to cover all modifications and equivalents within the scope of the following claims.

Upon reading this detailed description, those of skill in the art will appreciate still additional alternative structural and functional designs for a system and method for compact data storage of network traffic and efficient search through the disclosed principles of the present disclosure. Thus, while particular embodiments and applications of the present disclosure have been illustrated and described, it is to be understood that this disclosure is not limited to the precise construction and components disclosed herein and that various modifications, changes and variations which will be apparent to those skilled in the art may be made in the arrangement, operation and details of the method and apparatus of the present disclosure herein without departing from the spirit and scope of this disclosure as defined in the appended claims.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A computer-implemented method comprising:
   monitoring, by a detection system, user interactions, which are conducted by a plurality of users via a plurality of client devices, with a website on a server computer, wherein the monitoring comprises:
   receiving, by the detection system from the server computer over a network, webpage data associated with the user interactions, wherein the webpage data is associated with client device identifiers identifying the plurality of client devices and includes webpage temporal information related to the user interactions with the website; and
   receiving, by the detection system from a user assistance system over the network, assistance data for a plurality of assistance requests associated with the user interactions with the website, wherein the user assistance system receives, from a plurality of user devices, the assistance data during the plurality of assistance requests, and wherein the assistance data is associated with user identifiers identifying the plurality of user devices and includes assistance temporal information corresponding to the plurality of assistance requests;
   assigning, by the detection system, a portion of the webpage data to each of the plurality of assistance requests based on the assistance data, thereby generating labeled webpage data, wherein each portion of the webpage data is associated with a matching user identifier and matching assistance temporal information, wherein the matching user identifier corresponds to one of the client device identifiers that matches one of the user identifiers, and the matching assistance temporal information corresponds to the one of the user identifiers;
   analyzing the labeled webpage data to identify, in the portions of the webpage data, one or more key features that occur in the plurality of assistance requests at a frequency above a threshold;
   based on the one or more key features, determining resolution data that specifies an action for resolving an error associated with the one or more key features for at least one client device among the plurality of client devices; and
   sending the resolution data by the detection system to the server computer over the network, thereby causing the server computer to perform the action for resolving the error for the at least one client device, the action including:
   redirecting a webpage to a second webpage,
   prompting a user to reset a password,
   prompting the user to setup two factor authentication,
   prompting the user to sign-out then sign-in again to a user's account,
   sending, by the server computer to the at least one client device over the network, an indication to highlight, by the at least one client device, a particular element on the webpage that causes the error associated with the one or more key features, or
   initiating a chat bot that presents a notification to the user.

2. The computer-implemented method of claim 1, wherein the matching user identifier comprises a phone number, a username, or an email address.

3. The computer-implemented method of claim 1, further comprising:
   creating, using the one or more key features, a key feature database for use with subsequent assistance requests.

4. The computer-implemented method of claim 3, further comprising:
   receiving, from the user assistance system, current assistance data corresponding to a current assistance request;
   identifying current webpage data of a web session corresponding to the current assistance request by comparing the current assistance data to the webpage data of the web session;
   extracting a set of current features from the current webpage data;

comparing the set of current features to the one or more key features of the key feature database to identify one or more current key features that occur in the current webpage data; and determining current resolution data based on the one or more current key features.

5. The computer-implemented method of claim 4, further comprising:

providing the current resolution data to the user assistance system.

6. The computer-implemented method of claim 4, wherein the current resolution data includes the one or more current key features.

7. The computer-implemented method of claim 4, wherein the assistance data includes resolution data associated with resolved requests of the plurality of assistance requests, and wherein the computer-implemented method further comprises:

for each of the resolved requests, identifying a set of one or more key features in the webpage data assigned to the resolved requests; and storing, in the key feature database, the set of one or more key features in association with corresponding resolution data, wherein the current resolution data is determined from the key feature database.

8. The computer-implemented method of claim 4, wherein the current resolution data comprises at least one action and a certainty level indicating whether the at least one action resolves an error, and wherein the computer-implemented method further comprises:

determining that the certainty level exceeds a predetermined threshold; and providing the current resolution data to the server computer.

9. The computer-implemented method of claim 4, wherein the current resolution data comprises summary information derived from the one or more current key features.

10. The computer-implemented method of claim 1, wherein the analyzing the labeled webpage data to identify the one or more key features comprises:

identifying events from the labeled webpage data associated with each of the user identifiers at a time during a web session;

for each assistance request of the plurality of assistance requests, identifying a subset of the events that occurred within a time window of receipt of each assistance request, wherein the subset of the events is assigned to the assistance request; and analyzing the subset of the events to identify the one or more key features.

11. The computer-implemented method of claim 1, wherein the analyzing the labeled webpage data to identify the one or more key features comprises:

identifying events from the labeled webpage data associated with each of the user identifiers during a web session;

identifying a subset of the events occurring at an anomalous rate that deviates from an expected amount based on historical web sessions; and analyzing the subset of the events to identify the one or more key features.

12. The computer-implemented method of claim 1, wherein the analyzing the labeled webpage data to identify the one or more key features comprises:

identifying events from the labeled webpage data associated with each of the user identifiers at a time during a web session;

identifying a subset of the events correlated with web sessions that do not reach a target stage of the website; and analyzing the subset of the events to identify the one or more key features.

13. A computer-implemented method comprising:

monitoring, by a detection system, user interactions, which are conducted by a plurality of users via a plurality of client devices, with a website on a server computer, wherein the monitoring comprises:

receiving, by the detection system from a user assistance computer over a network, a user identifier, in response to a user of a client device requesting assistance for the website from the user assistance computer, wherein the user identifier identifies the user, and wherein the client device is one of the plurality of client devices;

determining, by the detection system, webpage data for a web session of the website, wherein the webpage data is stored in a database based on the user identifier, wherein the webpage data is received by the detection system from the server computer over the network and associated with the user interaction with the website that is conducted by the user using the client device;

extracting, by the detection system, features from the webpage data;

querying, by the detection system, using the extracted features, a key feature database to identify one or more key features corresponding to the extracted features;

based on the one or more key features, determining, by the detection system, resolution data that specifies an action for resolving an error associated with the one or more key features for the client device; and sending, by the detection system to the user assistance computer over the network, the resolution data, thereby causing the user assistance computer to perform the action for resolving the error for the client device, the action including:

redirecting a webpage to a second webpage, prompting the user to reset a password, prompting the user to setup two factor authentication, prompting the user to sign-out then sign-in again to a user's account, causing the client device to highlight a particular element on the webpage, wherein the particular element caused the error associated with the one or more key features, or initiating a chat bot that presents a notification to the user.

14. The computer-implemented method of claim 13, wherein the one or more key features occur in association with a population of assistance requests at a frequency above a threshold.

15. The computer-implemented method of claim 13, wherein the key feature database stores previous resolution data in association with key features from previous web sessions, and wherein the resolution data is determined using the key feature database.

16. The computer-implemented method of claim 15, wherein the one or more key features are multiple key features, and wherein determining the resolution data includes determining that at least a threshold amount of key features are stored in the key feature database in association with the resolution data.

17. The computer-implemented method of claim 16, wherein the multiple key features are associated with the resolution data with respective weights, and wherein the threshold amount is determined as a weighted average for each of the multiple key features that are associated with the resolution data.

18. The computer-implemented method of claim 15, further comprising:
updating which key features are associated with which resolution data based on subsequent assistant data, wherein the updating includes reducing a number of key features that are associated with the resolution data.

19. The computer-implemented method of claim 15, wherein the extracting the features from the webpage data comprises filtering the webpage data to exclude events that occur in at least a specified percentage of web sessions and to include events that indicate a problem with the website.

20. The computer-implemented method of claim 13, wherein the extracting the features from the webpage data comprises:
identifying, by the detection system, events in the webpage data associated with the user identifier at a time during the web session; and
identifying, by the detection system, a subset of the events that occurred within a time window of receipt of each assistance request, wherein the features are extracted from the subset of the events.

21. The computer-implemented method of claim 13, wherein the resolution data further comprises a certainty level indicating whether the action resolves the error, and wherein the computer-implemented method further comprises:
determining that the certainty level exceeds a predetermined threshold; and
providing the resolution data to the server computer associated with the web site.

22. The computer-implemented method of claim 13, wherein the resolution data comprises summary information derived from the one or more key features.

23. A method comprising:
monitoring, by a detection system, user interactions, which are conducted by a plurality of users via a plurality of client devices, with a website on a server computer, wherein the monitoring comprises receiving, by the detection system from the server computer over a network, webpage data associated with a user interaction with the website, conducted by a user using a client device among the plurality of client devices, wherein the webpage data includes an error and webpage temporal information related to the error;
extracting, by the detection system, features from the webpage data;
querying, by the detection system, using the extracted features, a key feature database to identify one or more key features corresponding to the extracted features;
based on the one or more key features, determining, by the detection system, resolution data that specifies an action for resolving an error associated with the one or more key features for the client device and a certainty level indicating whether the action resolves the error;
determining, by the detection system, whether or not the certainty level exceeds a predetermined threshold; and
if the certainty level exceeds the predetermined threshold, sending, by the detection system, the resolution data to the server computer over the network, thereby causing the server computer to perform the action for resolving the error for the client device, the action including:
redirecting a webpage to a second webpage,
prompting the user to reset a password,
prompting the user to setup two factor authentication,
prompting the user to sign-out then sign-in again to a user's account,
sending, by the server computer to the client device over the network, an indication to highlight, by the client device, a particular element on the webpage that causes the error associated with the one or more key features, or
initiating a chat bot that presents a notification to the user.

24. The method of claim 23, wherein the one or more key features occur in association with a population of assistance requests at a frequency above a threshold.

25. The method of claim 23, wherein the key feature database stores previous resolution data in association with key features from previous web sessions, and wherein the resolution data is determined using the key feature database.

26. The method of claim 25, wherein the determining the certainty level includes:
determining an amount of the extracted features that are stored in the key feature database in association with the action.

27. The method of claim 26, further comprising:
updating which key features are associated with which resolution data based on subsequent assistant data, wherein the updating includes reducing a number of key features that are associated with the resolution data.

28. The method of claim 23, wherein the extracting the features from the webpage data further comprises:
identifying events from the webpage data;
identifying a subset of the events that occur at an anomalous rate in a population of web sessions, wherein the anomalous rate deviates from an expected amount based on historical web sessions; and
analyzing the subset of the events to identify the one or more key features.

29. The method of claim 23, wherein the resolution data comprises summary information derived from the one or more key features.

* * * * *